United States Patent
Tagore et al.

(10) Patent No.: US 10,021,022 B2
(45) Date of Patent: Jul. 10, 2018

(54) PUBLIC NETWORK ADDRESS CONSERVATION

(71) Applicant: Juniper Networks, Inc., Sunnyvale, CA (US)

(72) Inventors: Kalyana Prakash Ravindranath Tagore, Bangalore (IN); Nithyananda Vishnu K S, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 193 days.

(21) Appl. No.: 14/822,359

(22) Filed: Aug. 10, 2015

(65) Prior Publication Data

US 2017/0005979 A1 Jan. 5, 2017

(30) Foreign Application Priority Data

Jun. 30, 2015 (IN) .......................... 3333/CHE/2015

(51) Int. Cl.
*H04L 12/721* (2013.01)
*H04L 29/12* (2006.01)

(52) U.S. Cl.
CPC .......... *H04L 45/38* (2013.01); *H04L 61/2514* (2013.01); *H04L 61/2517* (2013.01); *H04L 61/2557* (2013.01)

(58) Field of Classification Search
CPC . H04L 45/38; H04L 61/2514; H04L 61/2517; H04L 61/2557
See application file for complete search history.

(56) References Cited

U.S. PATENT DOCUMENTS

| | | | | | |
|---|---|---|---|---|---|
| 5,793,763 | A | * | 8/1998 | Mayes ................. | H01R 31/005 370/389 |
| 5,958,018 | A | * | 9/1999 | Eng ........................ | H04L 29/06 370/338 |
| 6,128,664 | A | * | 10/2000 | Yanagidate ....... | H04L 29/12367 370/389 |

(Continued)

OTHER PUBLICATIONS

The TCP/IP Guide, "IP NAT Port-Based ("Overloaded") Operation: Network Address Port Translation (NAPT) / Port Address Translation (PAT)", http://www.tcpipguide.com/free/t_IPNATPortBasedOverloadedOperationNetworkAddressPor.htm, Aug. 12, 2004, 7 pages.

*Primary Examiner* — Uzma Alam
(74) *Attorney, Agent, or Firm* — Harrity & Harrity, LLP

(57) ABSTRACT

A method may include receiving a first network traffic flow that is associated with a first private network address. The first network traffic flow may be destined to a first external network address. The method may include determining that the first external network address is not identified by a data structure. The data structure may identify external network addresses and private network addresses of network traffic flows to which a single public network address has been assigned. The method may include assigning the single public network address to the first network traffic flow based on determining that the first external network address is not identified by the data structure. The method may include storing the first external network address and the first private network address. The method may include outputting the first network traffic flow with the first external network address and the single public network address.

20 Claims, 26 Drawing Sheets

(56) References Cited

U.S. PATENT DOCUMENTS

| | | | |
|---|---|---|---|
| 7,406,709 B2 | 7/2008 | Maher, III et al. | |
| 7,441,262 B2* | 10/2008 | Hui | H04L 63/0227 709/229 |
| 7,949,110 B2* | 5/2011 | Abichandani | H04L 12/66 379/106.01 |
| 8,224,985 B2 | 7/2012 | Takeda | |
| 8,645,563 B2* | 2/2014 | Riley | H04L 43/10 709/232 |
| 9,356,833 B2* | 5/2016 | Xu | H04L 41/0836 |
| 9,391,887 B2* | 7/2016 | Suzuki | H04L 45/04 |
| 2003/0108055 A1* | 6/2003 | Damon | H04L 29/12009 370/401 |
| 2005/0265340 A1 | 12/2005 | Wu et al. | |
| 2006/0023744 A1 | 2/2006 | Chen et al. | |
| 2008/0130653 A1 | 6/2008 | Chen et al. | |
| 2009/0031042 A1* | 1/2009 | Phatak | H04L 29/12066 709/245 |
| 2009/0287829 A1* | 11/2009 | Matuszewski | H04L 29/12509 709/228 |
| 2010/0312870 A1* | 12/2010 | Kennedy | H04L 29/06 709/223 |
| 2011/0019682 A1* | 1/2011 | Zhu | H04L 61/255 370/401 |
| 2011/0047256 A1* | 2/2011 | Babu | H04L 29/12367 709/223 |
| 2011/0125910 A1* | 5/2011 | Sueda | H04M 7/003 709/227 |
| 2011/0216680 A1* | 9/2011 | Vogt | H04W 60/005 370/310 |
| 2011/0271340 A1* | 11/2011 | Vaidyanathan | H04L 63/1416 726/22 |
| 2012/0084464 A1* | 4/2012 | Cochinwala | H04L 43/026 709/246 |
| 2012/0263037 A1* | 10/2012 | Li | H04L 29/12462 370/230 |
| 2013/0034099 A1* | 2/2013 | Hikichi | H04L 61/2532 370/392 |
| 2013/0073743 A1* | 3/2013 | Ramasamy | H04L 67/1027 709/238 |
| 2014/0169374 A1* | 6/2014 | Gundavelli | H04L 12/4633 370/392 |
| 2014/0301191 A1* | 10/2014 | Ludwig | H04L 45/72 370/230 |
| 2014/0321462 A1* | 10/2014 | Kancherla | H04L 45/72 370/389 |
| 2015/0117445 A1* | 4/2015 | Koponen | H04L 41/0896 370/389 |
| 2015/0117454 A1* | 4/2015 | Koponen | H04L 61/2532 370/392 |

* cited by examiner

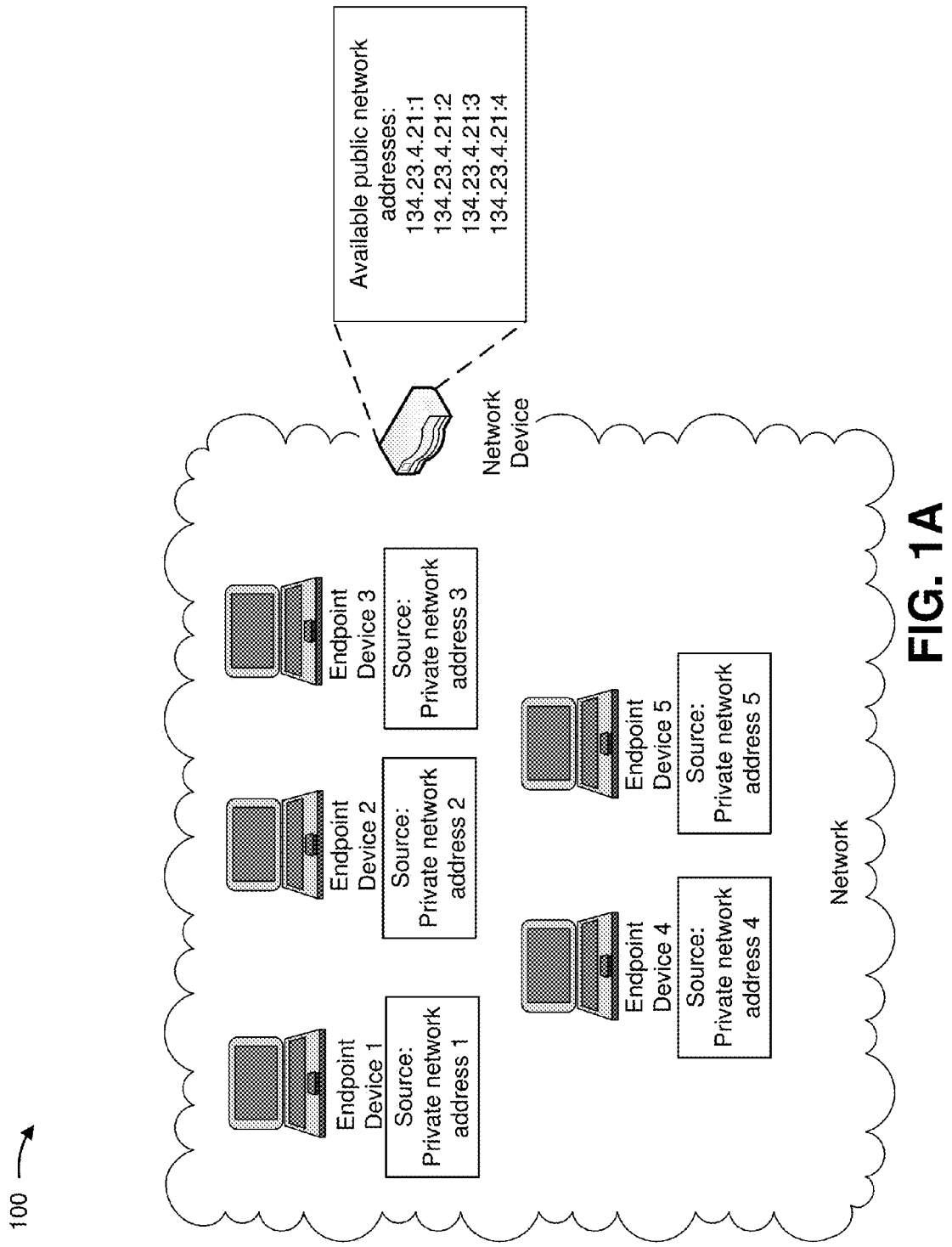

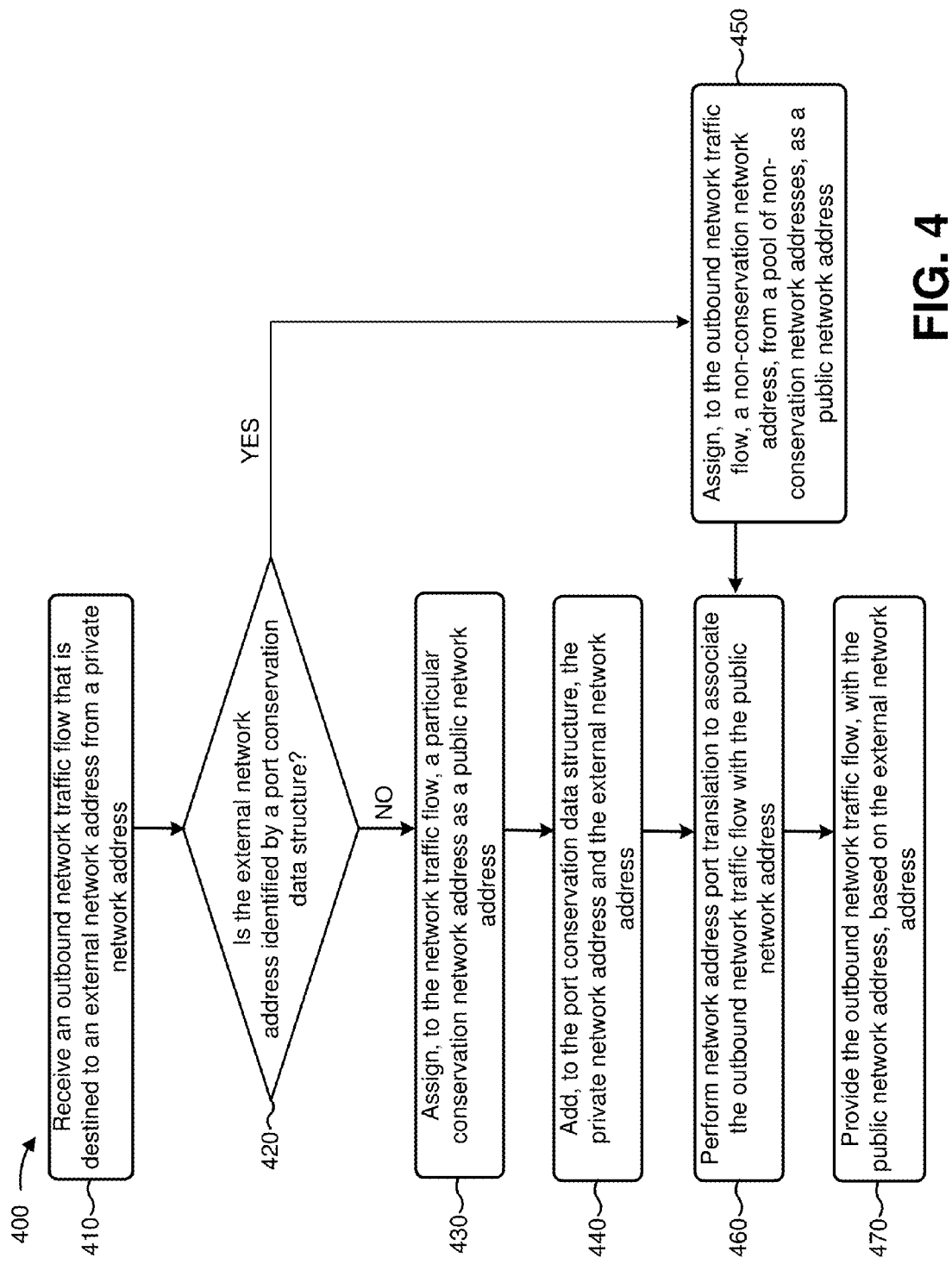

PUBLIC NETWORK ADDRESS CONSERVATION

RELATED APPLICATION

This application claims priority under 35 U.S.C. § 119 to Indian Provisional Application No. 3333/CHE/2015, filed on Jun. 30, 2015, the content of which is incorporated by reference herein in its entirety.

BACKGROUND

A network may include a variety of endpoint devices. One or more of the variety of endpoint devices may be associated with one or more private network addresses. When communicating with devices outside the network, a network device may assign, to network traffic flows originating from the variety of endpoint devices, public network addresses. The network and/or the network device may be associated with a limited quantity of public network addresses.

SUMMARY

According to some possible implementations, a device may include one or more processors. The one or more processors may receive a network traffic flow. The network traffic flow may be associated with a private network address and an external network address. The one or more processors may determine whether the external network address is identified in a data structure. The data structure may identify external network addresses and private network addresses of network traffic flows that are assigned a first public network address. The one or more processors may selectively assign, to the network traffic flow, the first public network address, or a second public network address, selected from a pool of available public network addresses, based on determining whether the external network address is identified by the data structure. The first public network address may be assigned to the network traffic flow when the external network address is not identified by the data structure. The second public network address may be assigned to the network traffic flow when the external network address is identified by the data structure. The one or more processors may provide the network traffic flow, with the first public network address or the second public network address, based on the external network address.

According to some possible implementations, a computer-readable medium may store one or more instructions. The one or more instructions, when executed by one or more processors, may cause the one or more processors to receive a network traffic flow that is associated with a private network address and that is destined for an external network address. The one or more instructions, when executed by one or more processors, may cause the one or more processors to determine whether the external network address is identified in a data structure. The data structure may identify external network addresses and private network addresses of network traffic flows that are assigned a first public network address. The one or more instructions, when executed by one or more processors, may cause the one or more processors to selectively assign, to the network traffic flow, the first public network address, or a second public network address, selected from a pool of available public network addresses, based on determining whether the external network address is identified by the data structure. The first public network address may be assigned to the network traffic flow when the external network address is not identified by the data structure. The second public network address may be assigned to the network traffic flows when the external network address is identified by the data structure. The second public network address may be selected from a pool of available public network addresses. The one or more instructions, when executed by one or more processors, may cause the one or more processors to provide, based on the external network address, the network traffic flow and the first public network address or the second public network address.

According to some possible implementations, a method may include receiving a first network traffic flow that is associated with a first private network address. The first network traffic flow may be destined to a first external network address. The method may include determining that the first external network address is not identified by a data structure. The data structure may identify external network addresses and private network addresses of network traffic flows to which a single public network address has been assigned. The method may include assigning the single public network address to the first network traffic flow based on determining that the first external network address is not identified by the data structure. The method may include storing, in the data structure, the first external network address and the first private network address. The method may include outputting the first network traffic flow with the first external network address and the single public network address.

BRIEF DESCRIPTION OF THE DRAWINGS

FIGS. 1A-1D are diagrams of an overview of an example implementation described herein;

FIG. 4 is a flow chart of an example process for assigning a public network address to an outbound network traffic flow based on a network port conservation algorithm;

DETAILED DESCRIPTION OF PREFERRED EMBODIMENTS

Figure 1B:
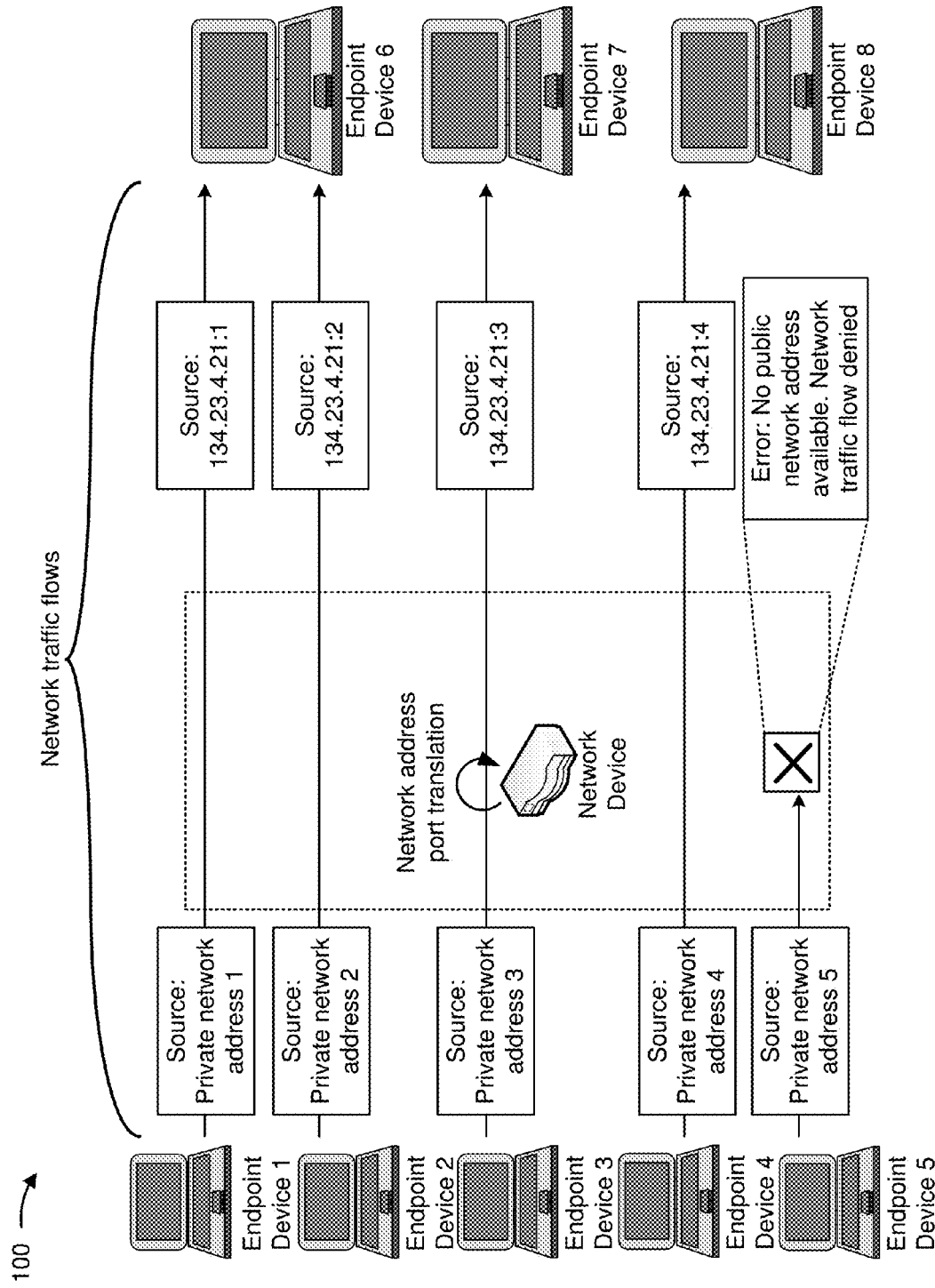

The following detailed description of example implementations refers to the accompanying drawings. The same reference numbers in different drawings may identify the same or similar elements.

Endpoint devices of a network may be associated with private network addresses. The private network addresses may each include, for example, an Internet Protocol (IP) address and/or a network port. Based on the private network addresses, the endpoint devices may provide network traffic flows to or receive network traffic flows from other devices in the network. Each network session, of the network, may be associated with a different IP address and network port combination. For example, each network service accessed by an endpoint device with a particular IP address, each web browser session associated with the endpoint device and/or the particular IP address, or the like, may be assigned a different IP address/network port combination (e.g., 10.1.1.1:1024, 10.1.1.1:1025, 10.1.1.1:1026, and so on).

When an endpoint device transmits a network traffic flow out of the network, a network device associated with the network may assign a public network address to the network traffic flow. The public network address may include, for example, an IP address and a network port, and may be assigned from a pool of public network addresses that are available to the network device and/or the network. The process of assigning a public network address to the network traffic flow may be referred to, in some cases, as "network address port translation."

The network and/or the network device may have a limited quantity of public network addresses to assign based on network address port translation, in some instances. As one possible example, the pool of available public network addresses, for the network device, may include one IP address and a range of network ports (e.g., 124.98.23.122:1 through 124.98.23.122:65535, etc.). In some cases, a quantity of private network addresses, associated with outbound network traffic flows of the network, may be greater than the limited quantity of public network addresses. For example, in the above possible example, if the network includes 70,000 endpoint devices that use 70,000 private network addresses, the network device may be able to assign public network addresses to only 65,535 of the endpoint devices. In such cases, the network device may assign all of the limited quantity of public network addresses, which may result in network congestion, dropped or denied outbound network traffic flows, and/or decreased efficiency of the network device.

Implementations described herein may enable the network device to conserve the limited pool of public network addresses by assigning a conservation network address to network traffic flows destined to previously un-encountered external network addresses. For example, the conservation network address may include a particular IP address and a particular network port, of the limited pool of public network addresses. The conservation network address may be reused for network traffic flows destined to another previously un-encountered external network address (e.g., another previously un-encountered IP address/network port combination). In some implementations, the network device may determine whether the external network address is a previously un-encountered external network address based on a port conservation data structure, which may store information associating the conservation network address, private network addresses, and external network addresses. In this way, the network device may reduce network congestion and/or conserve the limited quantity of public network addresses allotted to the network device and/or the network, which may improve efficiency of the network device and/or increase a quantity of endpoint devices that the network is capable of hosting.

FIGS. 1A-1D are diagrams of an overview of an example implementation 100 described herein. As shown in FIG. 1A, a network device may be associated with a network of five endpoint devices (e.g., endpoint device 1, endpoint device 2, endpoint device 3, endpoint device 4, and endpoint device 5). Here, endpoint device 1 is associated with private network address 1, endpoint device 2 is associated with private network address 2, endpoint device 3 is associated with private network address 3, endpoint device 4 is associated with private network address 4, and endpoint device 5 is associated with private network address 5. As further shown, the network device is associated with four public network addresses (e.g., four IP address/network port combinations of 134.23.4.21:1, 134.23.4.21:2, 134.23.4.21:3, and 134.23.4.21:4).

As shown in FIG. 1B, the set of endpoint devices 1 through 5 may transmit network traffic flows, via the network device, to a set of endpoint devices 6 through 8. As shown, a first network traffic flow and a second network traffic flow, originating from endpoint device 1 and endpoint device 2, respectively, may be transmitted to endpoint device 6. As further shown, a third network traffic flow, originating from endpoint device 3, may be transmitted to endpoint device 7. As shown, a fourth network traffic flow and a fifth network traffic flow, originating from endpoint device 4 and endpoint device 5, respectively, may be transmitted to endpoint device 8.

As further shown in FIG. 1B, the network traffic flows may identify private network addresses corresponding to the originating endpoint devices. Here, the first network traffic flow identifies private network address 1, the second network traffic flow identifies private network address 2, the third network traffic flow identifies private network address 3, the fourth network traffic flow identifies private network address 4, and the fifth network traffic flow identifies private network address 5. Assume that the five private network addresses each include a particular, different IP address/network port combination. For example, the five private network addresses may include a particular IP address and five different network ports, five different IP addresses and five different network ports, five different IP addresses and a particular network port, or some other combination of IP addresses and network ports.

As further shown in FIG. 1B, the network device may perform network address port translation to assign a public network address to each of the network traffic flows. Here, the network device assigns a first public network address of 134.23.4.21:1 to the first network traffic flow, a second public network address of 134.23.4.21:2 to the second network traffic flow, a third public network address of 134.23.4.21:3 to the third network traffic flow, and a fourth public network address of 134.23.4.21:4 to the fourth network traffic flow. Note that the four public network addresses are selected from the pool of public network addresses associated with the network device.

As shown, the network device does not assign a public network address to the fifth network traffic flow, based on having previously assigned each of the four public network addresses to other network traffic flows. As further shown, the network device does not transmit the fifth network traffic flow based on not assigning a public network address to the fifth network traffic flow. In this way, a network device may use all of the public network addresses available to the network device, and may delay or drop network traffic based on using all of the available public network addresses.

Figure 1C:
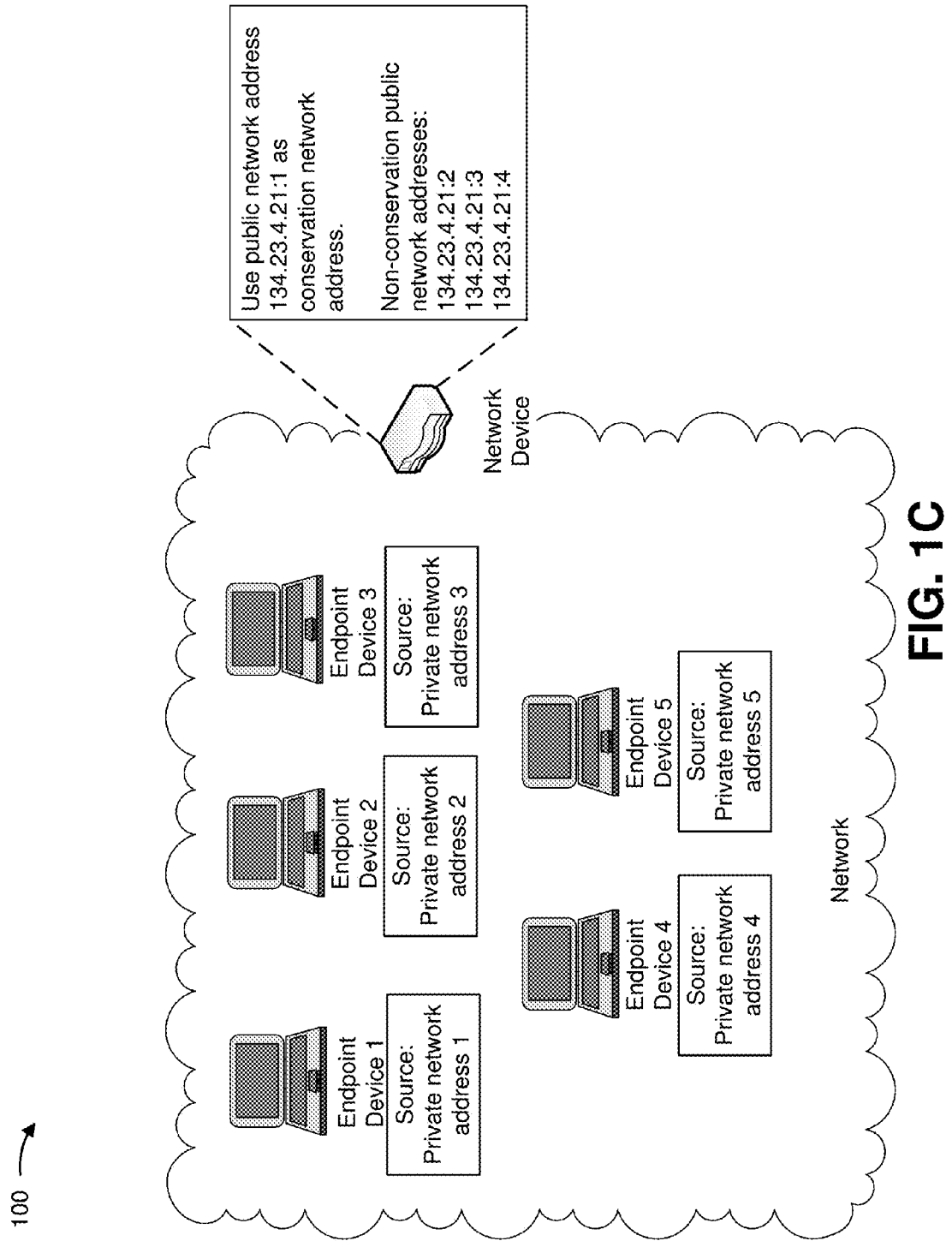
Figure 1D:
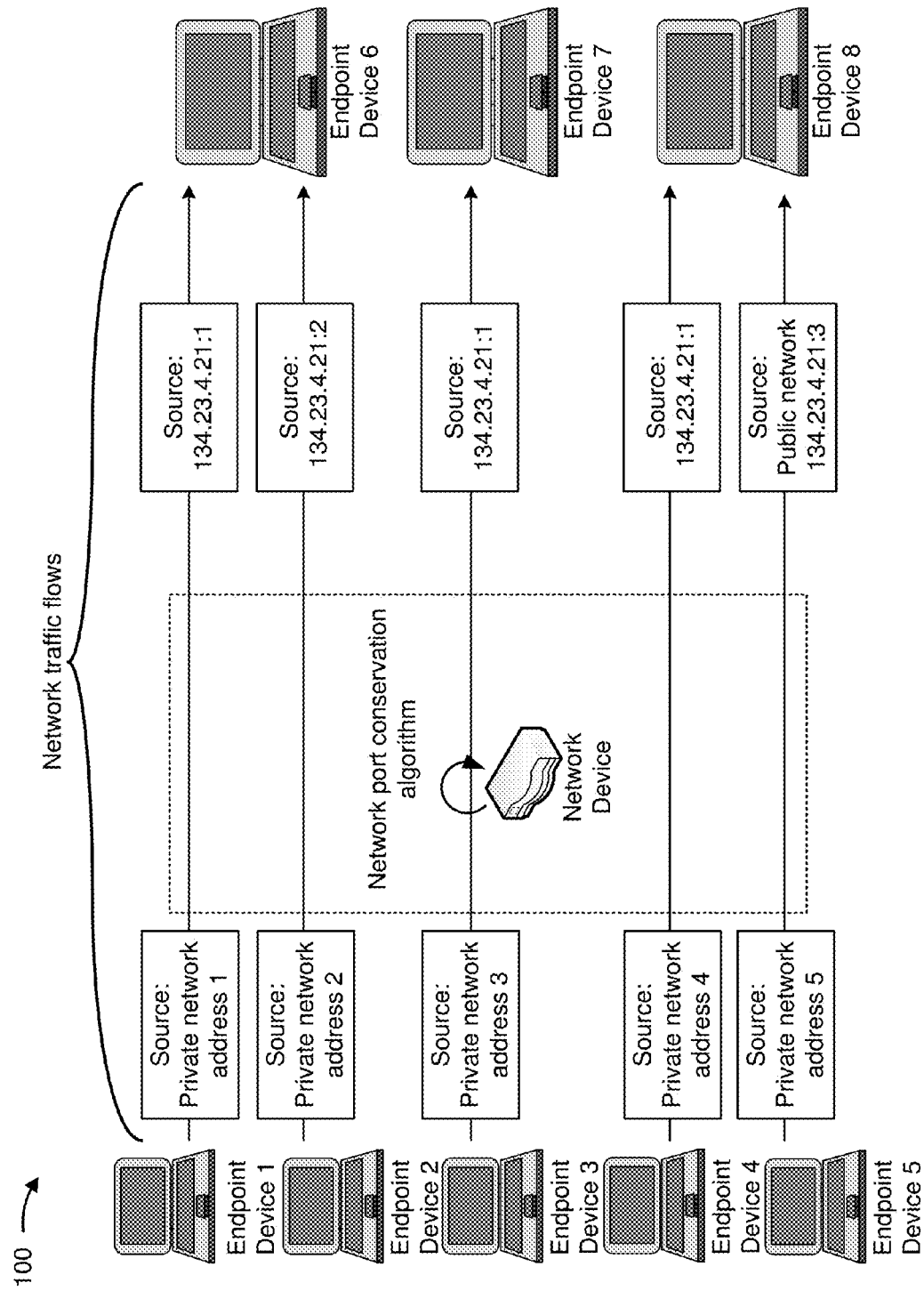

FIGS. 1C and 1D show an example of a possible implementation of a network port conservation algorithm, to conserve the limited quantity of available public network addresses (e.g., the limited quantity of available IP address/network port combinations). As shown in FIG. 1C, the network device may use a particular public network address, of the public network addresses available to the network device, as a conservation network address. Here, the network device uses the IP address/network port combination of 134.23.4.21:1 as a conservation network address, and uses the public network addresses of 134.23.4.21:2, 134.23.4.21:3, and 134.23.4.21:4 as non-conservation network addresses.

For the purpose of FIG. 1D, assume that the network device receives and processes the first network traffic flow, then the second network traffic flow, then the third network traffic flow, then the fourth network traffic flow, then the fifth network traffic flow. As shown in FIG. 1D, the network device may apply the network port conservation algorithm to reduce a quantity of public network addresses used by the five network traffic flows. Here, the network device assigns the conservation network address of 134.23.4.21:1 to each network traffic flow destined to a previously un-encountered endpoint device, of endpoint device 6, endpoint device 7, and endpoint device 8.

As further shown in FIG. 1D, the network device assigns the conservation network address of 134.23.4.21:1 to the first network traffic flow based on not having previously provided a network traffic flow to endpoint device 6. As shown, the network device assigns the non-conservation public network address of 134.23.4.21:2 to the second network traffic flow based on having previously assigned the conservation network address to a network traffic flow destined to endpoint device 6.

As further shown in FIG. 1D, the network device assigns the conservation network address of 134.23.4.21:1 to the third network traffic flow based on not having previously provided a network traffic flow to endpoint device 7. As shown, the network device assigns the conservation network address of 134.23.4.21:1 to the fourth network traffic flow based on not having previously provided a network traffic flow to endpoint device 8. As further shown, the network device assigns the non-conservation public network address of 134.23.4.21:3 to the fifth network traffic flow based on having previously assigned the conservation network address to a network traffic flow destined to endpoint device 8.

In this way, the network device may reduce a quantity of public network addresses (e.g., IP address/network port combinations, etc.) assigned during network address port translation, which may improve efficiency of the network device and/or reduce network congestion. Further, by conserving the quantity of public network addresses, the network device may increase a quantity of network traffic flows that the network device is capable of routing.

Figure 2:
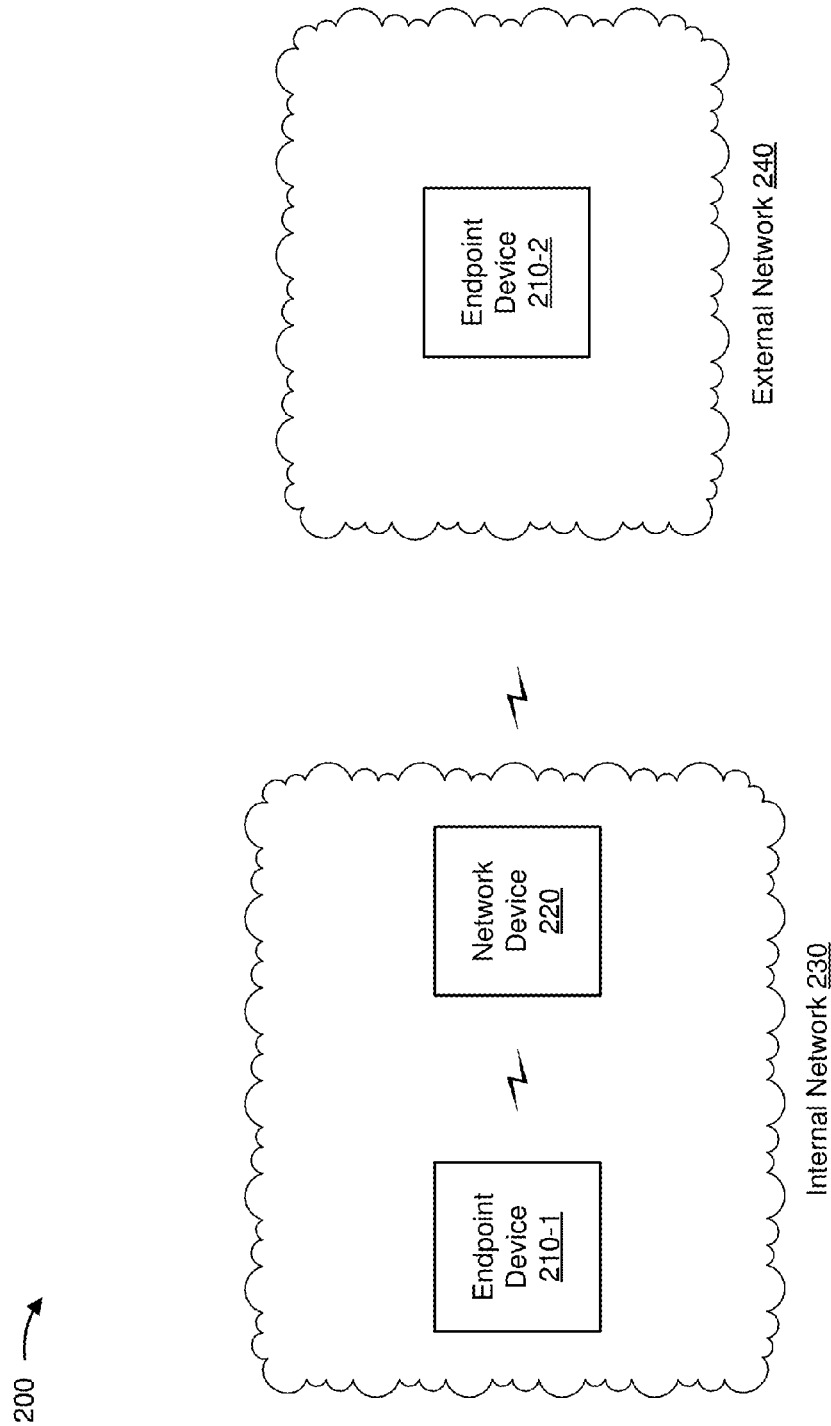
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an endpoint device 210-1 and a network device 220, which may be included in an internal network 230. As shown, environment 200 may further include an endpoint device 210-2, which may be included in an external network 240. Devices of environment 200 may interconnect via wired connections, wireless connections, or a combination of wired and wireless connections.

Endpoint device 210 may include one or more devices associated with providing and/or receiving network traffic. For example, endpoint device 210 may include a user device, a server device, or another device that can be a source or a destination of network traffic. In some implementations, endpoint device 210 may be associated with one or more network addresses (e.g., one or more Internet Protocol (IP) addresses, one or more network ports, etc.). For example, a first endpoint device 210, included in internal network 230, may be associated with one or more private network addresses (e.g., a single IP address and a single network port, a single IP address and multiple network ports, multiple IP addresses and a single network port, etc.), and a second endpoint device 210, included in external network 240, may be associated with one or more external network addresses (e.g., a single IP address and a single network port, a single IP address and multiple network ports, multiple IP addresses and a single network port, etc.).

Network device 220 may include one or more devices (e.g., one or more traffic transfer devices) capable of processing and/or transferring network traffic between endpoint devices 210. For example, network device 220 may include a firewall, a router, a gateway, a switch, a hub, a bridge, a forward proxy, a reverse proxy, a server (e.g., a proxy server), a security device, an intrusion detection device, a load balancer, or a similar device. Network device 220 may perform network address port translation on network traffic flows inbound to or outbound from endpoint device 210, of internal network 230. Network device 220 may perform network address port translation to assign a public network address (e.g., an IP address and a network port, etc.) to an outbound network traffic flow based on a network port conservation algorithm.

Internal network 230 may include one or more wired and/or wireless networks. For example, internal network 230 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks. Internal network 230 may include one or more endpoint devices 210 and/or network device 220.

External network 240 may include one or more wired and/or wireless networks. For example, external network 240 may include a cellular network (e.g., an LTE network, a 3G network, a CDMA network, etc.), a PLMN, a wireless local area network (e.g., a Wi-Fi network), a LAN, a WAN, a MAN, a telephone network (e.g., the PSTN), a private network, an ad hoc network, an intranet, the Internet, a fiber optic-based network, a cloud computing network, and/or a combination of these or other types of networks. External network 240 may include one or more endpoint devices 210 and/or network device 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
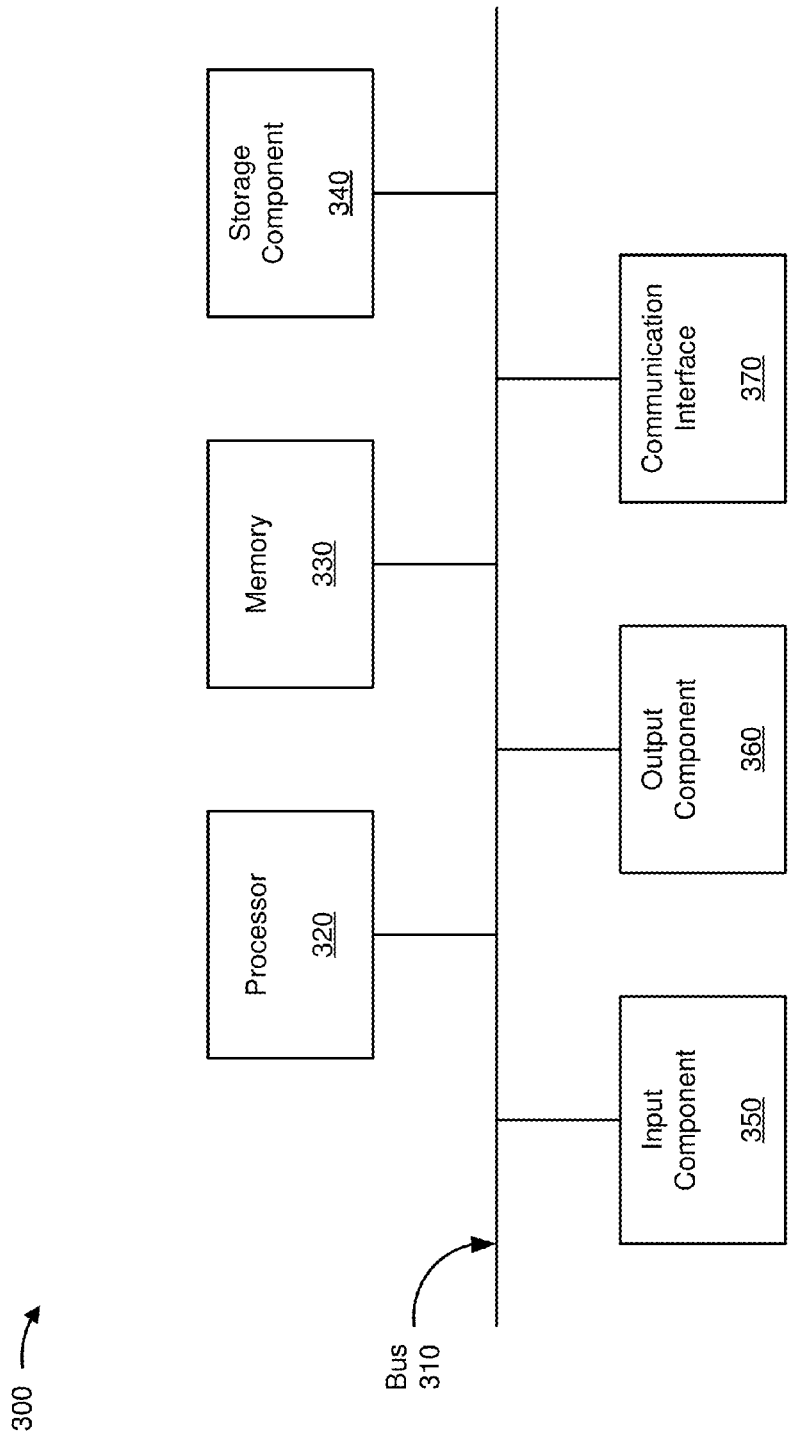
FIG. 3 is a diagram of example components of one or more devices of FIG. 2.

FIG. 3 is a diagram of example components of a device 300. Device 300 may correspond to endpoint device 210 and/or network device 220. In some implementations, endpoint device 210 and/or network device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for assigning a public network address to an outbound network traffic flow based on a network port conservation algorithm. In some implementations, one or more process blocks of FIG. 4 may be performed by network device 220. Additionally, or alternatively, one or more process blocks of FIG. 4 may be performed by another device or a group of devices separate from or including network device 220, such as endpoint device 210.

As shown in FIG. 4, process 400 may include receiving an outbound network traffic flow that is destined to an external network address from a private network address (block 410). For example, network device 220 may receive an outbound network traffic flow from endpoint device 210-1. Endpoint device 210-1 and network device 220 may be associated with internal network 230. Endpoint device 210-1 may be associated with a private network address, such as an IP address/network port combination, or the like. The private network address may be identified by the outbound network traffic flow (e.g., may be identified in headers of packets of the network traffic flow, may be identified by information associated with the network traffic flow, etc.). The outbound network traffic flow may be destined for an external network address (e.g., a combination of an IP address and a network port, etc.) associated with, for example, endpoint device 210-2 of external network 240.

Internal network 230 may include a group of endpoint devices 210-1, in some implementations. Each endpoint device 210-1, in the group, may be identified by one or more respective private network addresses of a set of private network addresses. The set of private network addresses may be used to route traffic within internal network 230. For example, network device 220, or another device, may generate and/or assign private network addresses to the group of endpoint devices 210-1. In some implementations, the private network addresses may be selected from a particular range of IP addresses and/or network ports (e.g., from between 10.0.0.0 and 10.255.255.255, from between 10.0.0.0:0 and 10.0.0.0:65535, etc.), or may be selected from the set of private network addresses.

Network device 220 and/or internal network 230 may be associated with one or more public network addresses (e.g., one or more IP address/network port combinations). A network traffic flow that is outbound from internal network 230 may be associated with a private network address of an endpoint device 210-1. Network device 220 may perform network address port translation to associate the network traffic flow with one of the one or more public network addresses. For example, network device 220 may replace the private network address, of the network traffic flow, with one of the one or more public network address.

In some implementations, network device 220 may assign a single public network address to multiple network traffic flows. For example, network device 220 may assign a public network address to a first network traffic flow and/or a first private network address, may cause or detect a cessation of the first network traffic flow, and may subsequently assign the public network address to a second network traffic flow and/or a second private network address. In this way, network device 220 may conserve public network addresses by assigning, to a quantity of private network addresses, a lesser quantity of public network address (e.g., lesser than the quantity of private network addresses).

In some implementations, network device 220 may assign, to different network traffic flows, a particular IP address and different network ports as public network addresses. For example, network device 220 may assign a public network address of 68.12.1.1:1 to a first network traffic flow, may assign a public network address of 68.12.1.1:2 to a second network traffic flow, and so on. By assigning public network addresses, including different network ports, to network traffic flows, network device 220 may conserve public IP addresses associated with network device 220 and/or internal network 230.

However, network device 220 and/or internal network 230 may be associated with a limited quantity of public network addresses (e.g., a limited quantity of IP address/network port combinations, etc.). For example, network device 220 may be capable of assigning a limited quantity of public network addresses (e.g., 255 public network addresses, 65,535 public network addresses, etc.). As another example, network device 220 may be capable of assigning, as a public network address, a single IP address and a limited quantity of network ports in association with the single IP address (e.g., 68.12.1.1:1 to 68.12.1.1:65535, etc.). In some cases, a quantity of private network addresses and/or network traffic flows may approach, equal, or exceed the limited quantity of public network addresses. Network device 220 may experience network congestion as network device 220 assigns, to outbound network traffic flows, a quantity of public network addresses equal to or greater than the limited quantity of public network addresses.

As further shown in FIG. 4, process 400 may include determining whether the external network address is identified by a port conservation data structure (block 420). For example, network device 220 may perform network address port translation to reduce a quantity of public network addresses consumed by endpoint devices 210-1 of internal network 230. However, network device 220 may be capable of assigning a limited quantity of public network addresses using network address port translation, and a certain quantity of network sessions and/or endpoint devices 210-1 may use most of or all of the limited quantity of public network addresses. To prevent this from happening, network device 220 may use a network port conservation algorithm to reduce public network address consumption by endpoint devices 210-1.

Network device 220 may store information related to the network port conservation algorithm in a port conservation data structure (e.g., a table, a database, a linked list, etc.). The port conservation data structure may associate private network addresses, external network addresses, and/or one or more conservation network addresses. For example, network device 220 may assign a particular conservation network address (e.g., a particular IP address/network port combination, etc.) to network traffic flows en route to external network addresses that are not identified in the port conservation data structure. Based on assigning the particular conservation network address to the network traffic flows, network device 220 may store a private network address and an external network address, for each of the network traffic flows, in the port conservation data structure. In this way, network device 220 may assign the particular conservation network address to network traffic flows en route to previously un-encountered external network addresses (e.g., previously un-encountered IP address/network port combinations, etc.), which may conserve the limited quantity of public network addresses.

In some implementations, network device 220 may generate a search key to determine whether the port conservation data structure identifies the external network address of the outbound traffic flow. For example, network device 220 or another device (e.g., endpoint device 210, etc.) may generate a search key based on an external network address of a network traffic flow. The port conservation data structure may identify one or more search keys corresponding to network traffic flows that have previously been assigned the conservation network address. Based on the external network address of the outbound traffic flow, network device 220 may generate a search key, and may compare the generated search key to the one or more search keys identified by the port conservation data structure. In this way, network device 220 may reduce processor resource requirements by searching the port conservation data structure based on a search key, rather than an external network address, and/or may improve security of the network port conservation algorithm by obscuring external network addresses identified by the port conservation data structure.

As further shown in FIG. 4, if the external network address is not identified by the port conservation data structure (block 420—NO), process 400 may include assigning, to the network traffic flow, a particular conservation network address as a public network address (block 430). For example, based on determining that the external network address of an outbound network traffic flow is not identified by the port conservation data structure, network device 220 may assign a particular conservation network address to the outbound network traffic flow for network address port translation. The conservation network address may include a particular IP address and a particular network port, in some implementations. By assigning the conservation network address to a network traffic flow en route to an external network address (e.g., an IP address/network port combination, etc.) that is not identified by the port conservation data structure, network device 220 may conserve public network addresses of internal network 230, which may reduce network congestion in situations where a quantity of network traffic flows equals or exceeds a quantity of public network addresses associated with internal network 230.

As further shown in FIG. 4, if the external network address is not identified in the port conservation data structure (block 420—NO), process 400 may include adding, to the port conservation data structure, the private network address and the external network address (block 440). For example, based on assigning the conservation network address to the outbound network traffic flow, network device 220 may add, to the port conservation data structure, the private network address and the external network address of the outbound network traffic flow (e.g., the IP address/network port combination of the private network address, and the IP address/network port combination of the external network address).

When network device 220 receives, from the external network address, an inbound network traffic flow associated with the conservation network address, network device 220 may determine a private network address associated with the inbound network traffic flow based on an association between the private network address and the external network address (e.g., by reference to the port conservation data structure). In this way, network device 220 may assign a single conservation network address to network traffic flows from multiple private network addresses, which may conserve public network addresses and, thereby, reduce network congestion in situations where a quantity of network traffic flows equals or exceeds a quantity of public network addresses associated with internal network 230.

As further shown in FIG. 4, if the external network address is identified in the port conservation data structure (block 420—YES), process 400 may include assigning, to the outbound network traffic flow, a non-conservation network address, from a pool of non-conservation network addresses, as a public network address (block 450). For example, network device 220 may receive an outbound network traffic flow that is associated with a particular external network address that is identified by the port conservation data structure (e.g., a particular IP address/network port combination, etc.). The particular external network address may be identified by the port conservation data structure based on network device 220 having previously assigned the conservation network address to a network traffic flow en route to the particular external network address. Based on determining that the particular external network address is identified by the port conservation data structure, network device 220 may assign, to the outbound network traffic flow, a non-conservation network address as a public network address, and may perform network address port translation to associate the network traffic flow, and/or a particular private network address of the network traffic flow, with the non-conservation network address.

In some implementations, network device 220 may select or generate the non-conservation network address based on a pool of available public network addresses (e.g., a pool of available IP address/network port combinations, etc.). For example, network device 220 may assign, to a network traffic flow, a public network address, and may remove the public network address from the pool of available public network addresses. Assume that the network traffic flow ends. Based on the network traffic flow ending, network device 220 may return the public network address to the pool of available public network addresses, for assignment to another network traffic flow.

In some implementations, network device 220 may store information based on assigning a non-conservation network address to an outbound network traffic flow. For example, network device 220 may store information associating the non-conservation network address and a private network address of the outbound network traffic flow, for use to determine the private network address of an inbound network traffic flow that is associated with the non-conservation network address.

As further shown in FIG. 4, process 400 may include performing network address port translation to associate the outbound network traffic flow with the public network address (block 460). For example, network device 220 may perform network address port translation on the outbound network traffic flow, to associate the outbound network traffic flow with the public network address. In some implementations, network device 220 may replace the private network address with the public network address (e.g., in a source address field of a header of the network traffic flow, in a source address field of headers of packets included in the network traffic flow, etc.). In situations where the external network address is not identified by the port conservation data structure, network device 220 may associate the outbound network traffic flow with the conservation network address. In situations where the external network address is identified by the port conservation data structure, network device 220 may associate the outbound network traffic flow with a non-conservation network address. In this way, network device 220 may reduce a quantity of public network addresses used by endpoint devices 210-1 by assigning, to outbound network traffic flows, the conservation network address.

As further shown in FIG. 4, process 400 may include providing the outbound network traffic flow, with the public network address, based on the external network address (block 470). For example, network device 220 may provide the network traffic flow based on the external network address. In some implementations, network device 220 may transmit the network traffic flow toward endpoint device 210-2, which may be associated with the external network address. Network device 220 may perform network address port translation to associate, with the outbound network traffic flow, the conservation network address or a non-conservation network address, selected from a pool of available public network addresses. In some implementations, network device 220 may associate the public network address with the outbound network traffic flow by replacing a private network address, of the network traffic flow, with the public network address.

In this way, network device 220 may conserve public network addresses by assigning the same conservation network address (e.g., the same IP address/network port combination) to multiple network traffic flows destined to previously un-encountered external network addresses (e.g., previously un-encountered IP address/network port combinations). By assigning the same conservation network address, network device 220 may reduce network congestion in situations where a quantity of network traffic flows exceeds a quantity of available public network addresses and/or permit network device 220 to perform network traffic services for an increased quantity of endpoint devices 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5I are diagrams of an example implementation 500 relating to example process 400 shown in FIG. 4. FIGS. 5A-5I show an example of assigning a public network address to an outbound network traffic flow based on a network port conservation algorithm. For the purpose of FIGS. 5A-5I, assume that endpoint device 210-1 and network device 220 are included in internal network 230, and assume that endpoint device 210-2 is included in external network 240. Assume further that endpoint device 210-1 is associated with a first private network address of 10.1.1.1:1000 and a second private network address of 10.1.1.2:1000, and assume that endpoint device 210-2 is associated with a first external network address of 73.152.12.13:80, a second external network address of 73.152.12.15:1000, and a third external network address of 73.152.12.13:21.

Figure 5A:
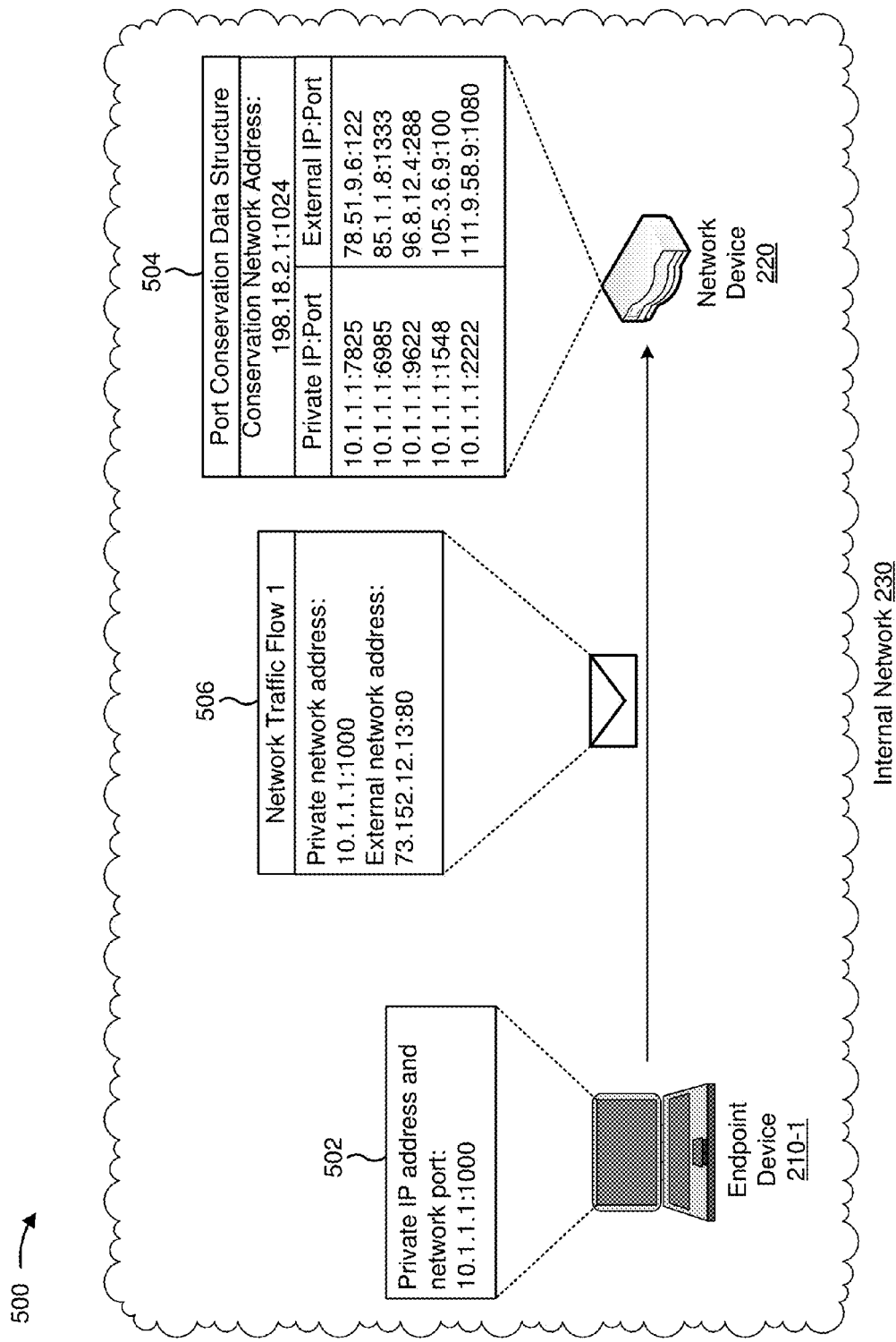
FIGS. 5A-5I are diagrams of an example implementation relating to the example process shown in FIG. 4.

As shown in FIG. 5A, and by reference number 502, endpoint device 210-1 may be associated with the first private network address (e.g., an IP address of 10.1.1.1 and a network port of 1000). As shown by reference number 504, network device 220 may store a port conservation data structure. The port conservation data structure may associate private network addresses and external network addresses with a conservation network address. Here, a private IP address and network port of 10.1.1.1:7825 is associated with an external IP address and network port of 78.51.9.6:122, a private IP address and network port of 10.1.1.1:6985 is associated with an external IP address and network port of 85.1.1.8:1333, a private IP address and network port of 10.1.1.1:9622 is associated with an external IP address and network port of 96.8.12.4:288, a private IP address and network port of 10.1.1.1:1548 is associated with an external IP address and network port of 105.3.6.9:100, and a private IP address and network port of 10.1.1.1:2222 is associated with an external IP address and network port of 111.9.58.9:1080.

As shown by reference number 506, network device 220 may receive, from endpoint device 210-1, a first network traffic flow (e.g., shown as "Network Traffic Flow 1"). As shown, the first network traffic flow may be associated with the first private network address (e.g., the IP address and network port of 10.1.1.1:1000) and the first external network address (e.g., an IP address and network port of 73.152.12.13:80).

Figure 5B:
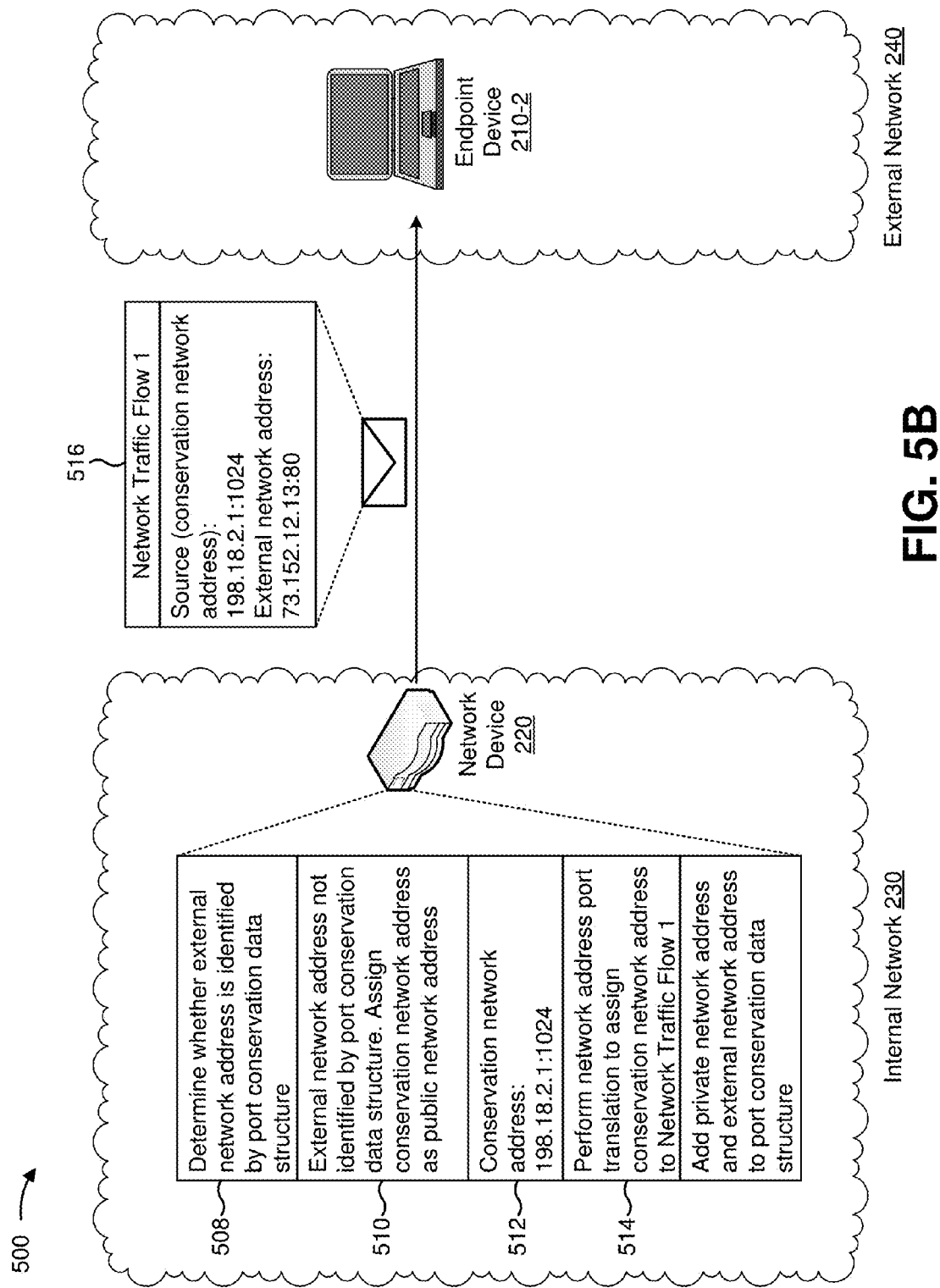

As shown in FIG. 5B, and by reference number 508, network device 220 may determine whether the first external network address is identified by the port conservation data structure. As shown by reference number 510, network device 220 may determine that the first external network address is not identified by the port conservation data structure. As shown, network device 220 may assign, to the first network traffic flow, a conservation network address as a public network address.

As shown by reference number 512, the conservation network address may include an IP address and network port of 198.18.2.1:1024. As shown by reference number 514, network device 220 may perform network address port translation to associate the conservation network address with the first network traffic flow. As shown, based on performing network address port translation, network device 220 may store information in the port conservation data structure (e.g., the first private network address and the first external network address). As shown by reference number 516, network device 220 may transmit, toward endpoint device 210-2, the first network traffic flow. Assume that network device 220 transmits the first network traffic flow toward endpoint device 210-2 based on endpoint device 210-2 being associated with the external network address of the first network traffic flow.

Figure 5C:
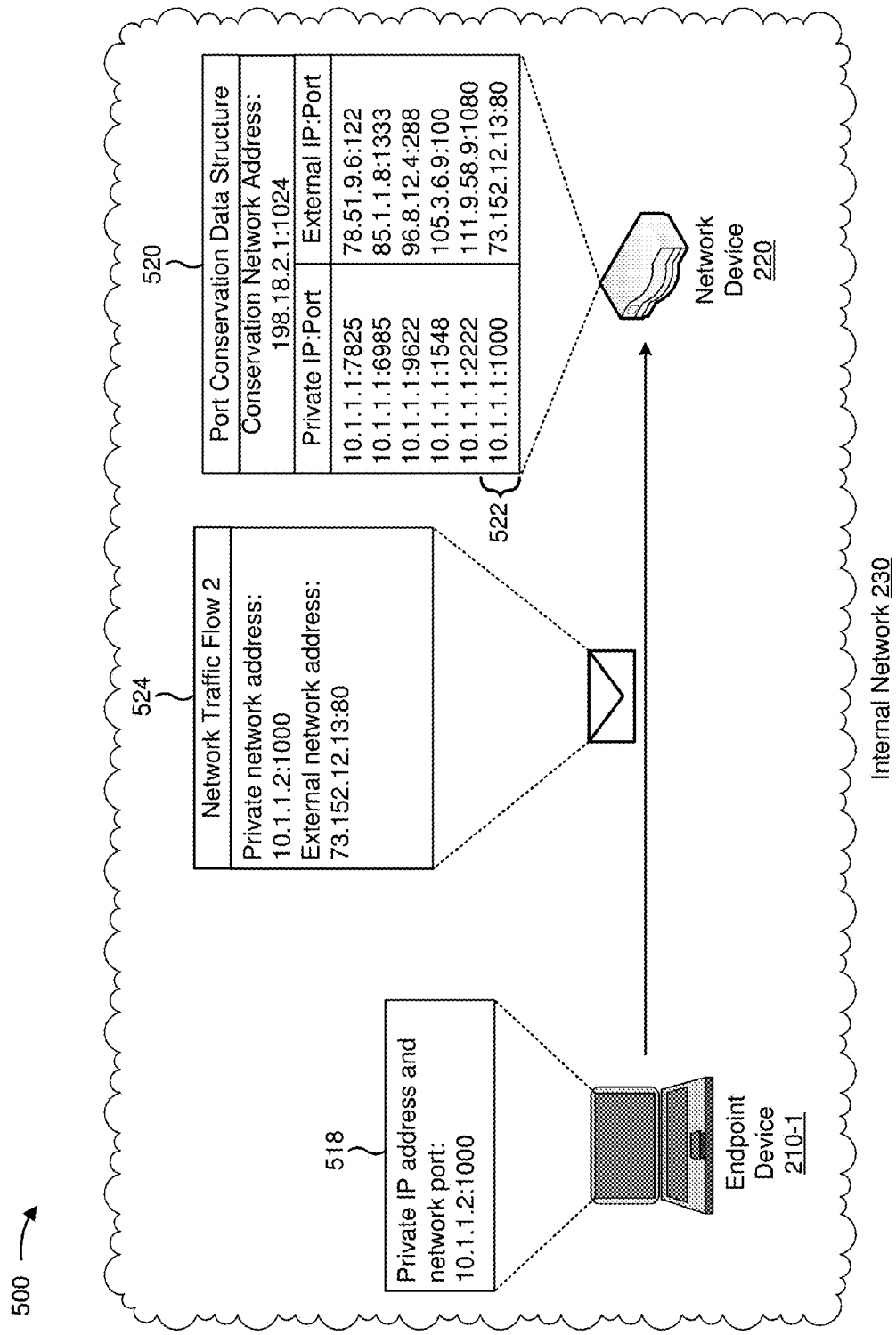

As shown in FIG. 5C, and by reference number 518, endpoint device 210-1 may be associated with the second private network address (e.g., an IP address and network port of 10.1.1.2:1000). As shown by reference number 520, network device 220 may store the port conservation data structure. As shown by reference number 522, the port conservation data structure may include the values described in connection with FIG. 5A, as well as the first private network address of 10.1.1.1:1000 and the first external network address of 73.152.12.13:80. As shown by reference number 524, network device 220 may receive a second network traffic flow that is associated with the second private network address of 10.1.1.2:1000 and the first external network address of 73.152.12.13:80.

Figure 5D:
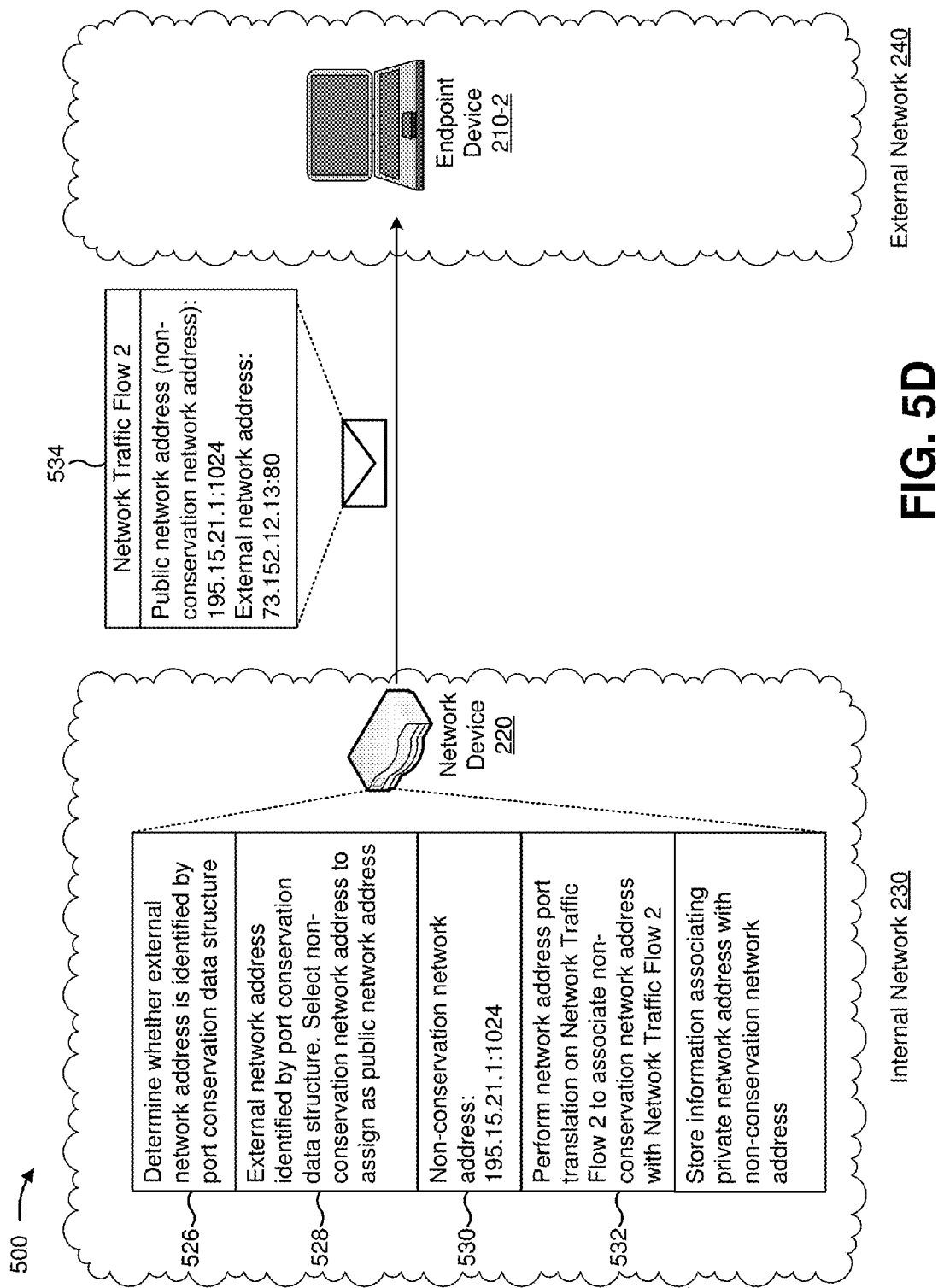

As shown in FIG. 5D, and by reference number 526, network device 220 may determine whether the first external network address is identified by the port conservation data structure. As shown by reference number 528, network device 220 determines that the first external network address is identified by the port conservation data structure, and selects a non-conservation network address to assign as a public network address accordingly. Assume that network device 220 selects the non-conservation network address from a pool of available public network addresses associated with internal network 230. As shown by reference number 530, network device 220 assigns an IP address and network port of 195.15.21.1:1024 as the non-conservation network address. Assume that network device 220 selects the non-conservation network address from a range of available public network addresses that are associated with network device 220, or from a set of available public network addresses.

As shown by reference number 532, network device 220 performs network address port translation to associate the non-conservation network address with the second network traffic flow. As further shown, network device 220 stores information associating the second private network address with the non-conservation network address. As shown by reference number 534, network device 220 provides the second network traffic flow to endpoint device 210-2. Assume that network device 220 provides the second network traffic flow to endpoint device 210-2 based on endpoint device 210-2 being associated with the first external network address.

Figure 5E:
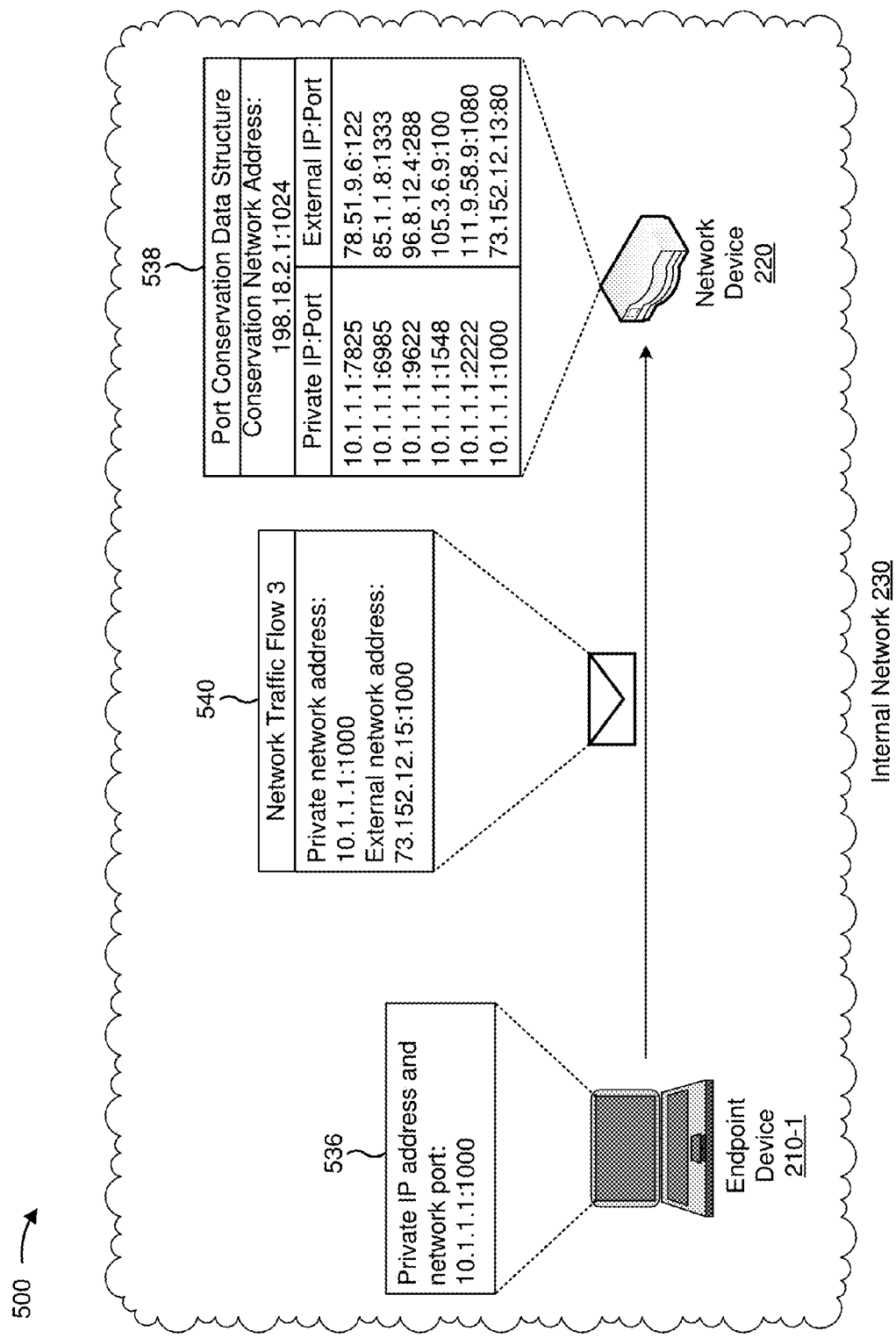

As shown in FIG. 5E, and by reference number 536, endpoint device 210-1 may be associated with the first private network address of 10.1.1.1:1000. As shown by reference number 538, network device 220 may store the port conservation data structure, including the first private network address of 10.1.1.1:1000 and the first external network address of 73.152.12.13:80. As shown by reference number 540, network device 220 may receive a third network traffic flow from endpoint device 210-1. As shown, the third network traffic flow may be associated with the first private network address of 10.1.1.1:1000 and the second external network address (e.g., an IP address and network port of 73.152.12.15:1000).

Figure 5F:
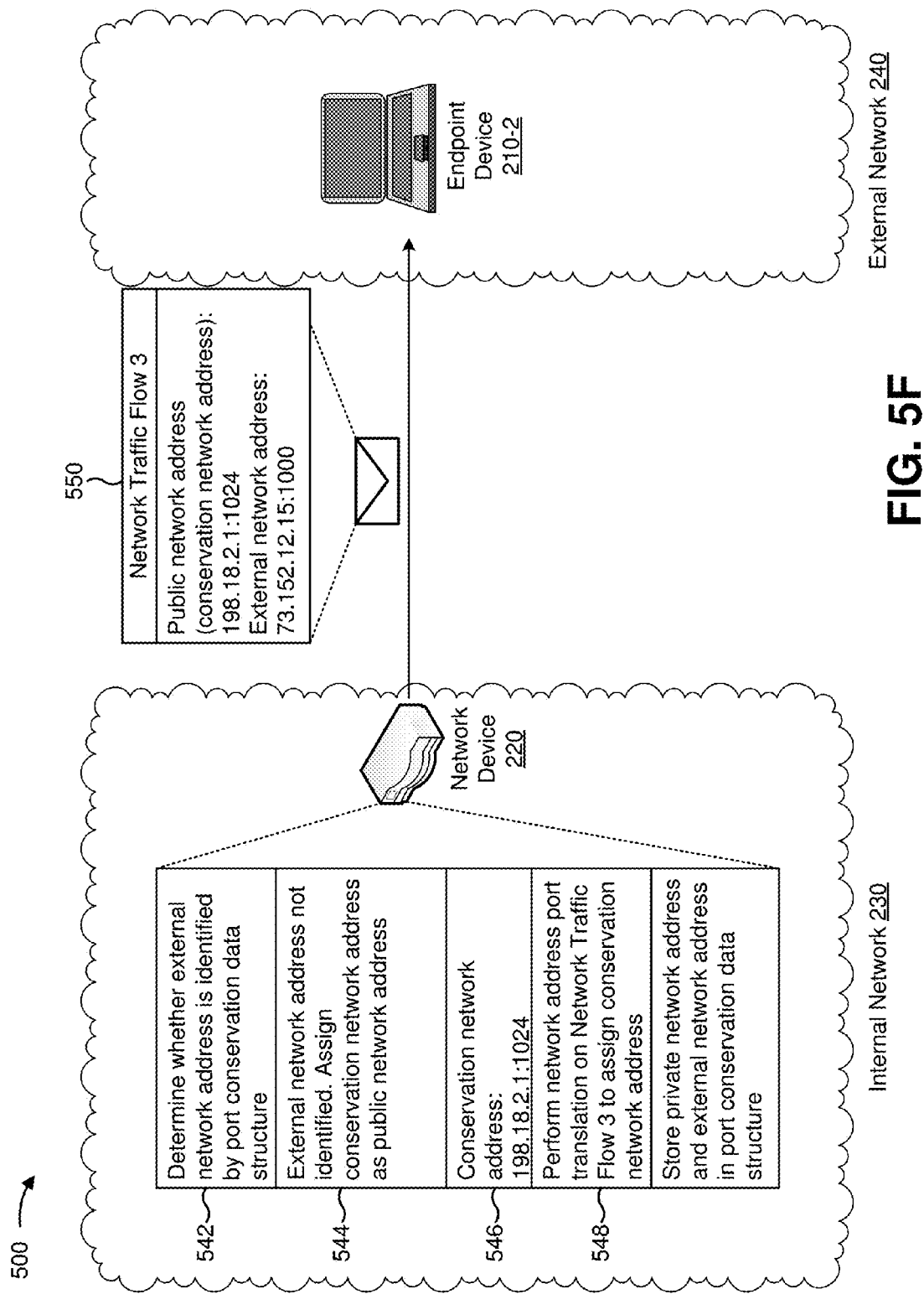

As shown in FIG. 5F, and by reference number 542, network device 220 may determine whether the second external network address of 73.152.12.15:1000 is identified by the port conservation data structure. As shown by reference number 544, network device 220 determines that the second external network address is not identified by the port conservation data structure, and assigns the conservation network address as the public network address of the third network traffic flow. As shown by reference number 546, the conservation network address may include an IP address of 198.18.2.1 and a network port of 1024, and may be equivalent to the conservation network address assigned to the first network traffic flow.

As shown by reference number 548, network device 220 may perform network address port translation to associate the conservation network address with the third network traffic flow. As shown, network device 220 may store, in the port conservation data structure, information associated with the third network traffic flow (e.g., the first private network address and the second external network address). As shown by reference number 550, network device 220 provides the third network traffic flow to endpoint device 210-2. Assume that network device 220 provides the third network traffic flow to endpoint device 210-2 based on endpoint device 210-2 being associated with the second external network address. As shown, the third network traffic flow is associated with the conservation network address.

Figure 5G:
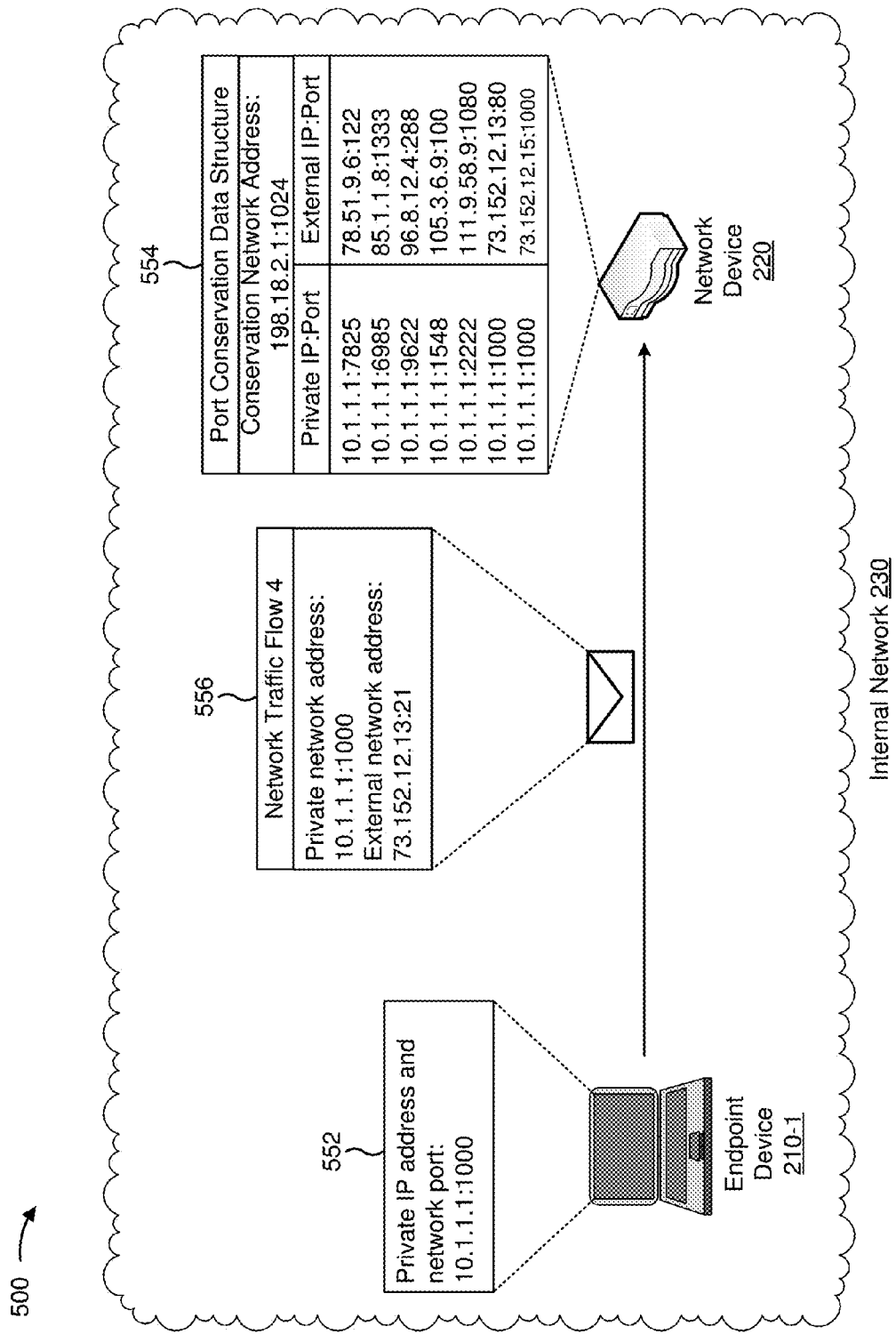

As shown in FIG. 5G, and by reference number 552, endpoint device 210-1 may be associated with the first private network address of 10.1.1.1:1000. As shown by reference number 554, network device 220 may store the port conservation data structure, including the first private network address of 10.1.1.1:1000, the first external network address of 73.152.12.13:80, and the second external network address of 73.152.12.15:1000. As shown by reference number 556, network device 220 may receive a fourth network traffic flow from endpoint device 210-1. As shown, the third network traffic flow may be associated with the first private network address of 10.1.1.1:1000 and the third external network address (e.g., the IP address and network port of 73.152.12.13:21).

Figure 5H:
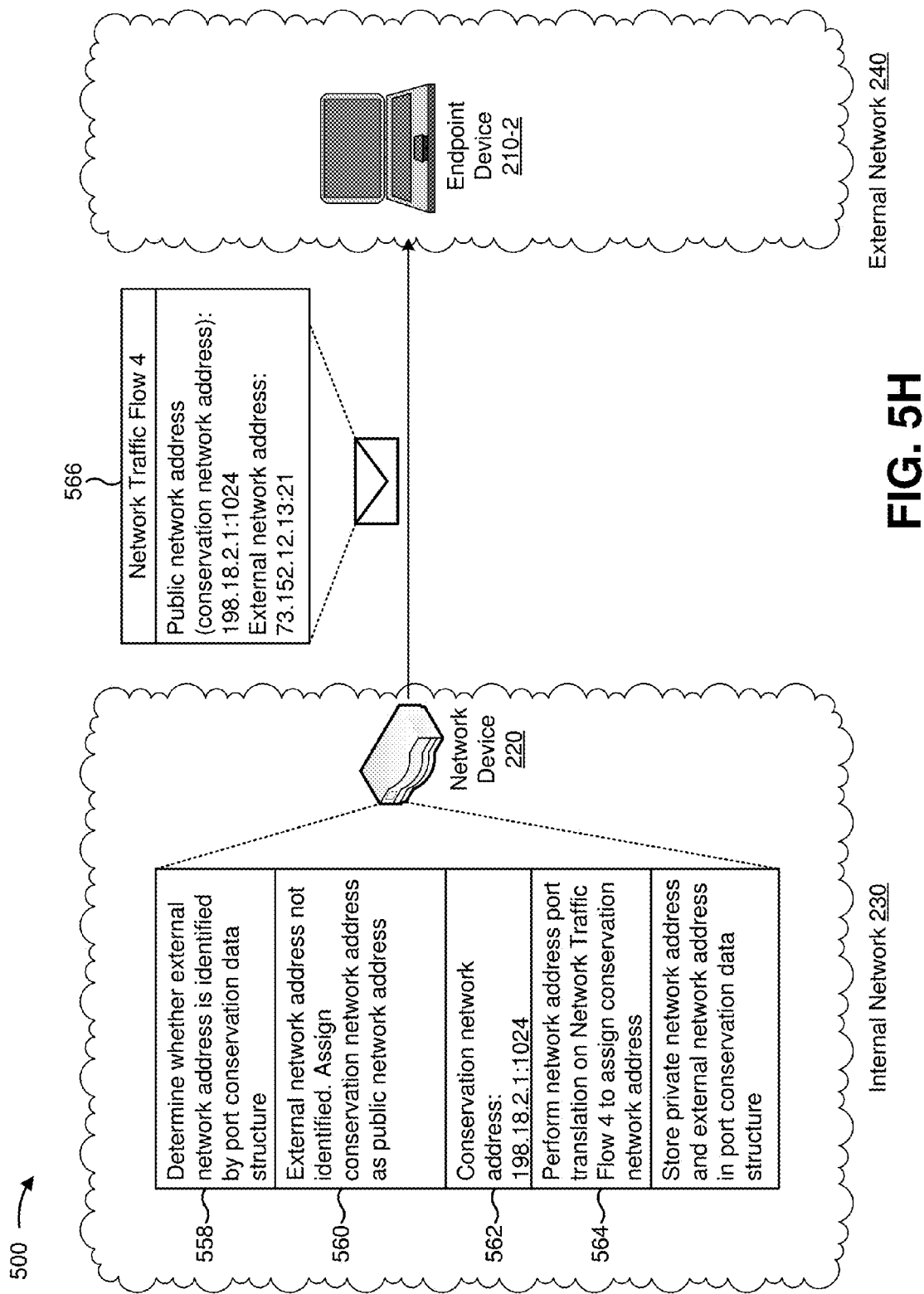

As shown in FIG. 5H, and by reference number 558, network device 220 may determine whether the second external network address of 73.152.12.13:21 is identified by the port conservation data structure. As shown by reference number 560, network device 220 determines that the second external network address is not identified by the port conservation data structure, and assigns the conservation network address as the public network address of the fourth network traffic flow. As shown by reference number 562, the conservation network address may include an IP address of 198.18.2.1 and a network port of 1024, and may be equivalent to the conservation network address assigned to the first network traffic flow and the third network traffic flow.

Figure 5I:
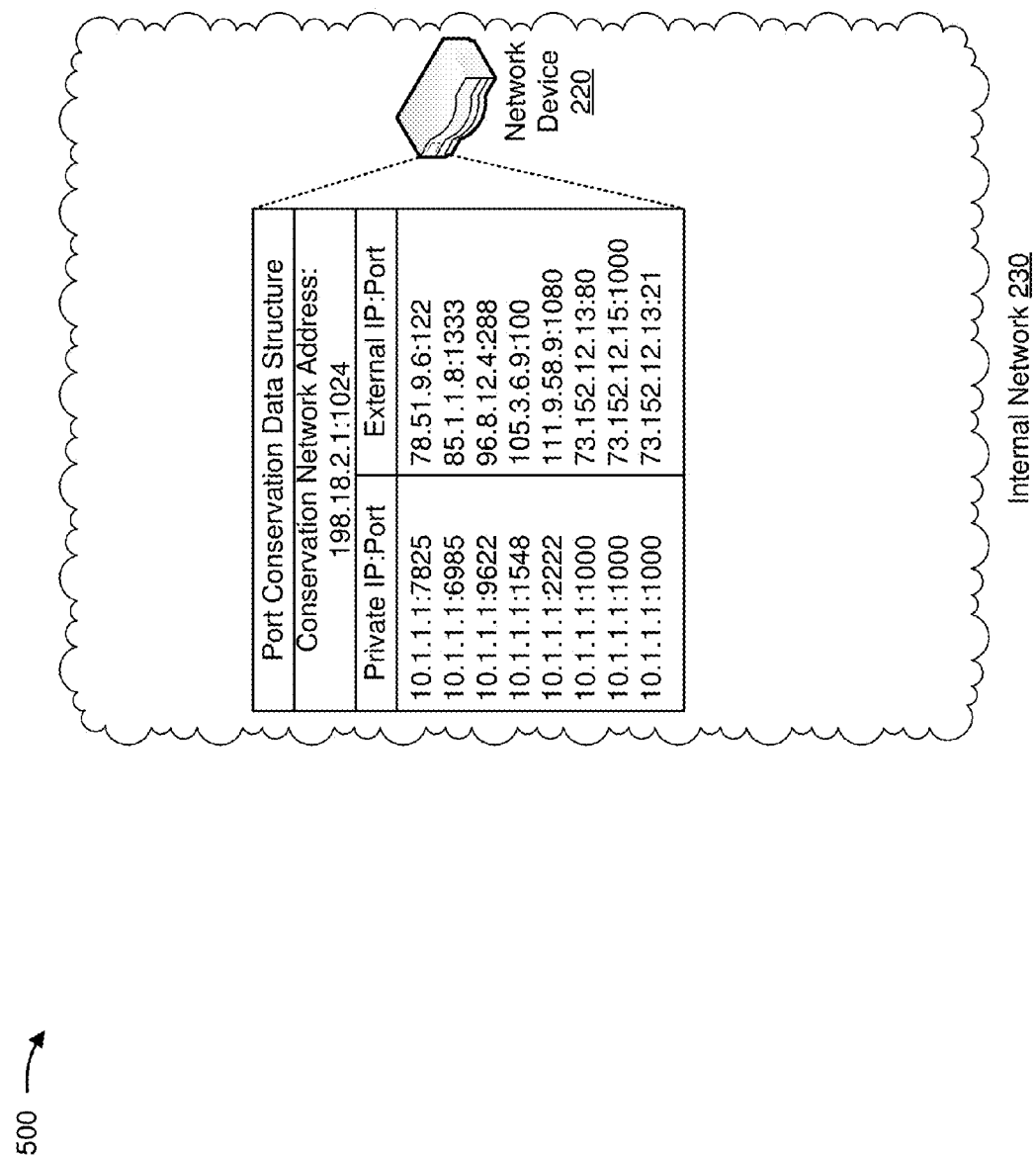

As shown by reference number 564, network device 220 may perform network address port translation to associate the conservation network address with the fourth network traffic flow. As shown, network device 220 may store, in the port conservation data structure, information associated with the fourth network traffic flow (e.g., the first private network address and the third external network address). As shown by reference number 566, network device 220 provides the fourth network traffic flow to endpoint device 210-2. Assume that network device 220 provides the fourth network traffic flow to endpoint device 210-2 based on endpoint device 210-2 being associated with the third external network address. As shown, the fourth network traffic flow is associated with the conservation network address. As shown in FIG. 5I, the port conservation data structure may associate the first private network address (e.g., 10.1.1.1:1000), the third external network address (e.g., 73.152.12.13:21), and the conservation network address.

As indicated above, FIGS. 5A-5I are provided merely as an example. Other examples are possible and may differ from what was described with regard to FIGS. 5A-5I.

Figure 6:
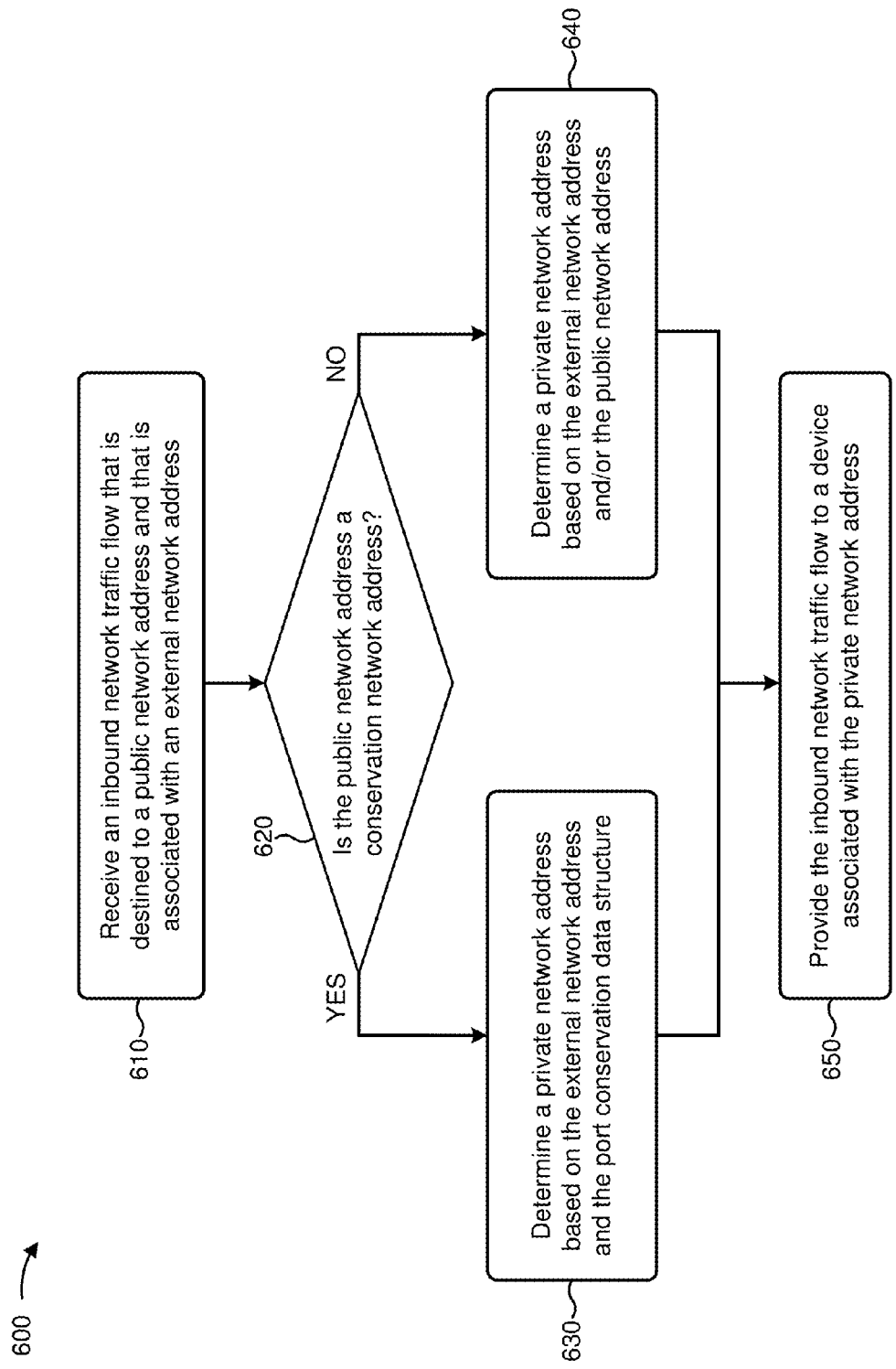
FIG. 6 is a flow chart of an example process for determining a private network address of an inbound network traffic flow based on a network port conservation algorithm.

FIG. 6 is a flow chart of an example process 600 for determining a private network address of an inbound network traffic flow based on a network port conservation algorithm. In some implementations, one or more process blocks of FIG. 6 may be performed by network device 220. Additionally, or alternatively, one or more process blocks of FIG. 6 may be performed by another device or a group of devices separate from or including network device 220, such as endpoint device 210.

As shown in FIG. 6, process 600 may include receiving an inbound network traffic flow that is destined to a public network address and that is associated with an external network address (block 610). For example, network device 220 may receive an inbound network traffic flow from an external network address associated with endpoint device 210-2 and/or external network 240. The inbound network traffic flow may be destined to a public network address associated with network device 220 and/or internal network 230, such as a conservation network address or a non-conservation network address.

As further shown in FIG. 6, process 600 may include determining whether the public network address is a conservation network address (block 620). For example, network device 220 may determine whether the public network address, associated with the inbound network traffic flow, is a conservation network address. Based on determining whether the public network address is a conservation network address, network device 220 may selectively determine the private network address associated with the inbound network traffic flow based on the port conservation data structure or based on stored information associating non-conservation network addresses with private network addresses.

In some implementations, network device 220 may store (e.g., in the port conservation data structure) information identifying the conservation network address, and may determine that the public network address matches the conservation network address based on the stored information. In some implementations, network device 220 may determine that the public network address is a non-conservation network address by determining that the public network address is not a conservation network address. For example, network device 220 may determine that the public network address does not match the stored information identifying the conservation network address, and may accordingly determine that the public network address is a non-conservation network address. By determining whether the public network address is a conservation network address before searching a list of used non-conservation network addresses, network device 220 may conserve processor resources in situations where the public network address is a conservation network address.

Additionally, or alternatively, network device 220 may determine that the public network address is a conservation network address based on a characteristic of the public network address. For example, network device 220 may assign network addresses, within a particular range of network addresses, as conservation network addresses, and may determine that the public network address is within the particular range.

As further shown in FIG. 6, if the public network address is a conservation network address (block 620—YES), process 600 may include determining a private network address based on the external network address and the port conservation data structure (block 630). For example, network device 220 may determine that the public network address is a conservation network address. The port conservation data structure may store and/or associate private network addresses and external network addresses of network traffic flows that are assigned the conservation network address. Based on the port conservation data structure, and based on the external network address of the network traffic flow, network device 220 may determine the private network address of the network traffic flow.

As further shown in FIG. 6, if the public network address is not a conservation network address (block 620—NO), process 600 may include determining a private network address based on the external network address and/or the public network address (block 640). For example, in situations where the public network address is a non-conservation network address, network device 220 may determine a private network address based on the external network address and/or the non-conservation network address. For example, network device 220 may determine the private network address based on information stored in association with assigning the non-conservation network address to an outgoing network traffic flow originating from the private network address.

As further shown in FIG. 6, process 600 may include providing the inbound network traffic flow to a device associated with the private network address (block 650). For example, network device 220 may provide the inbound network traffic flow to an endpoint device 210-1 that is associated with the private network address. In some implementations, network device 220 may replace the public network address, with the private network address, in a destination field of one or more headers of the network traffic flow. In this way, network device 220 may perform network address port translation based on a network port conservation algorithm, which may conserve a limited quantity of public network addresses associated with network device 220 and/or reduce network congestion caused by assigning most of or all of the limited quantity of public network addresses.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7F are diagrams of an example implementation 700 relating to example process 600 shown in FIG. 6. FIGS. 7A-7F show an example of determining a private network address of an inbound network traffic flow based on a network port conservation algorithm. For the purpose of FIGS. 7A-7F, assume that the operations described in connection with FIGS. 5A-5F have been performed. Assume further that endpoint device 210-1 is associated with a first private network address of 10.1.1.1:1000 and a second private network address of 10.1.1.2:1000. Assume that endpoint device 210-2 is associated with a first external network address of 73.152.12.13:80 and a second external network address of 73.152.12.15:1000.

Figure 7A:
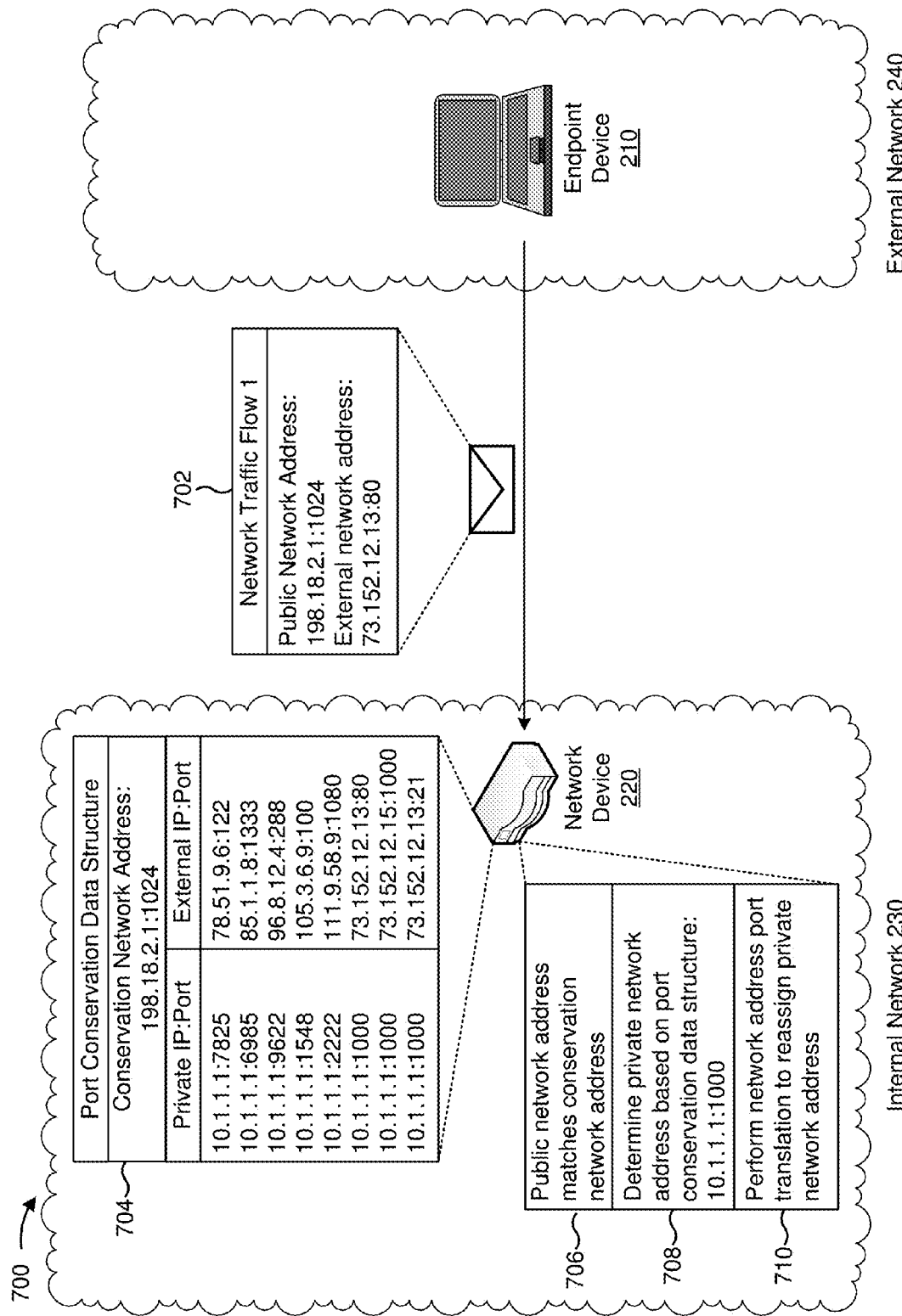
FIGS. 7A-7F are diagrams of an example implementation relating to the example process shown in FIG. 6.

As shown in FIG. 7A, and by reference number 702, network device 220 may receive, from endpoint device 210-2, a first network traffic flow (e.g., "Network Traffic Flow 1"). As shown, the first network traffic flow may be associated with a first public network address (e.g., an IP address and network port of 198.18.2.1:1024) and the first external network address of 73.152.12.13:80. As shown by reference number 704, network device 220 may store a port conservation data structure that identifies the conservation network address of 198.18.2.1:1024. As shown, the port conservation data structure may identify private network addresses and associated external network addresses. As further shown, the port conservation data structure may associate the first private network address of 10.1.1.1:1000 with the first external network address of 73.152.12.13:80.

As shown by reference number 706, network device 220 may determine that the public network address matches the conservation network address. Assume that network device 220 compares the public network address of the first network traffic flow to the conservation network address identified by the port conservation data structure to determine that the public network address matches the conservation network address.

As shown by reference number 708, network device 220 may refer to the port conservation data structure to determine a private network address that is associated with the first external network address of the first network traffic flow. As shown, network device 220 determines that the first private network address of 10.1.1.1:1000 is associated with the first external network address. As shown by reference number 710, network device 220 performs network address port translation to reassign, to the first network traffic flow, the first private network address.

Figure 7B:
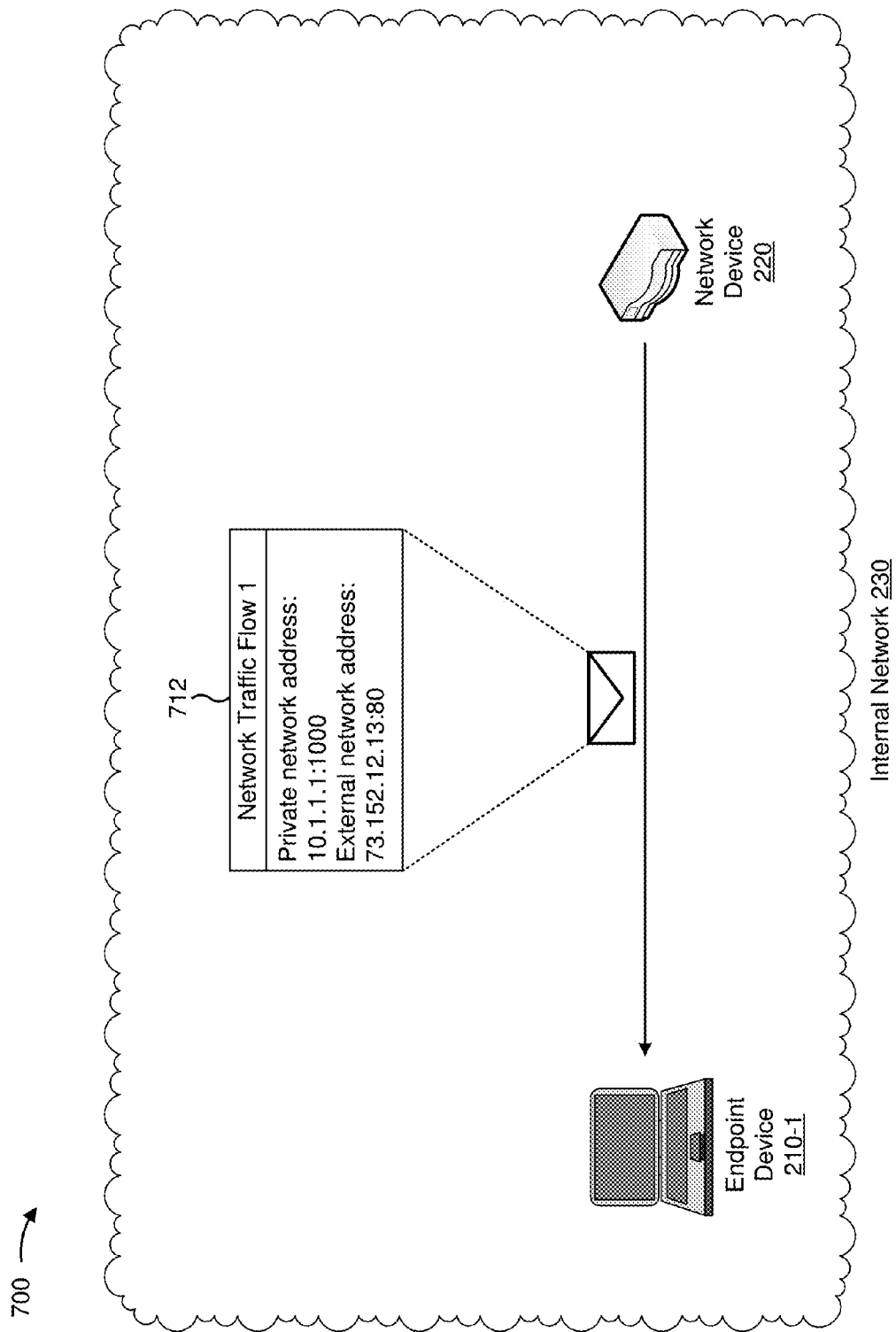

As shown in FIG. 7B, and by reference number 712, network device 220 may provide, to endpoint device 210-1, the first network traffic flow. Assume that network device 220 provides the first network traffic flow to endpoint device 210-1 based on endpoint device 210-1 being associated with the first private network address of 10.1.1.1:1000.

Figure 7C:
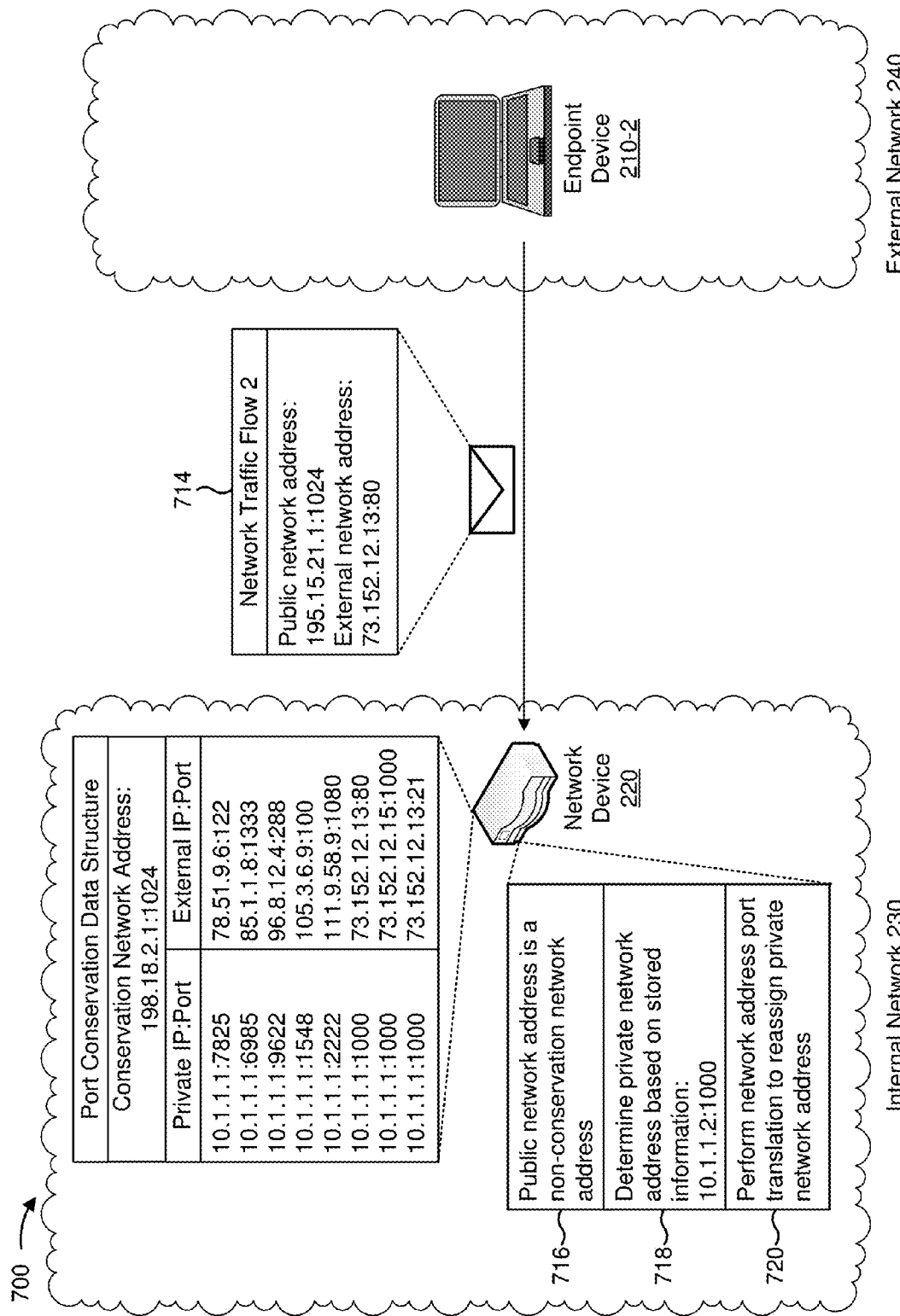

As shown in FIG. 7C, and by reference number 714, network device 220 may receive, from endpoint device 210-2, a second network traffic flow (e.g., "Network Traffic Flow 2"). As shown, the second network traffic flow may be associated with a second public network address (e.g., 195.15.21.1:1024). As shown by reference number 716, network device 220 may determine that the public network address, associated with the second network traffic flow, does not match the conservation network address (e.g., may determine that the public network address is a non-conservation network address). Assume that network device 220 compares the public network address to the conservation network address, identified by the port conservation data structure, to determine that the public network address does not match the conservation network address.

As shown by reference number 718, network device 220 may determine a private network address of the second network traffic flow (e.g., the second private network address of 10.1.1.2:1000) based on stored information. Assume that the stored information associates the first external network address of 73.152.12.13:80 and the second private network address of 10.1.1.2:1000. As shown by reference number 720, network device 220 may perform network address port translation to reassign, to the second network traffic flow, the second private network address.

Figure 7D:
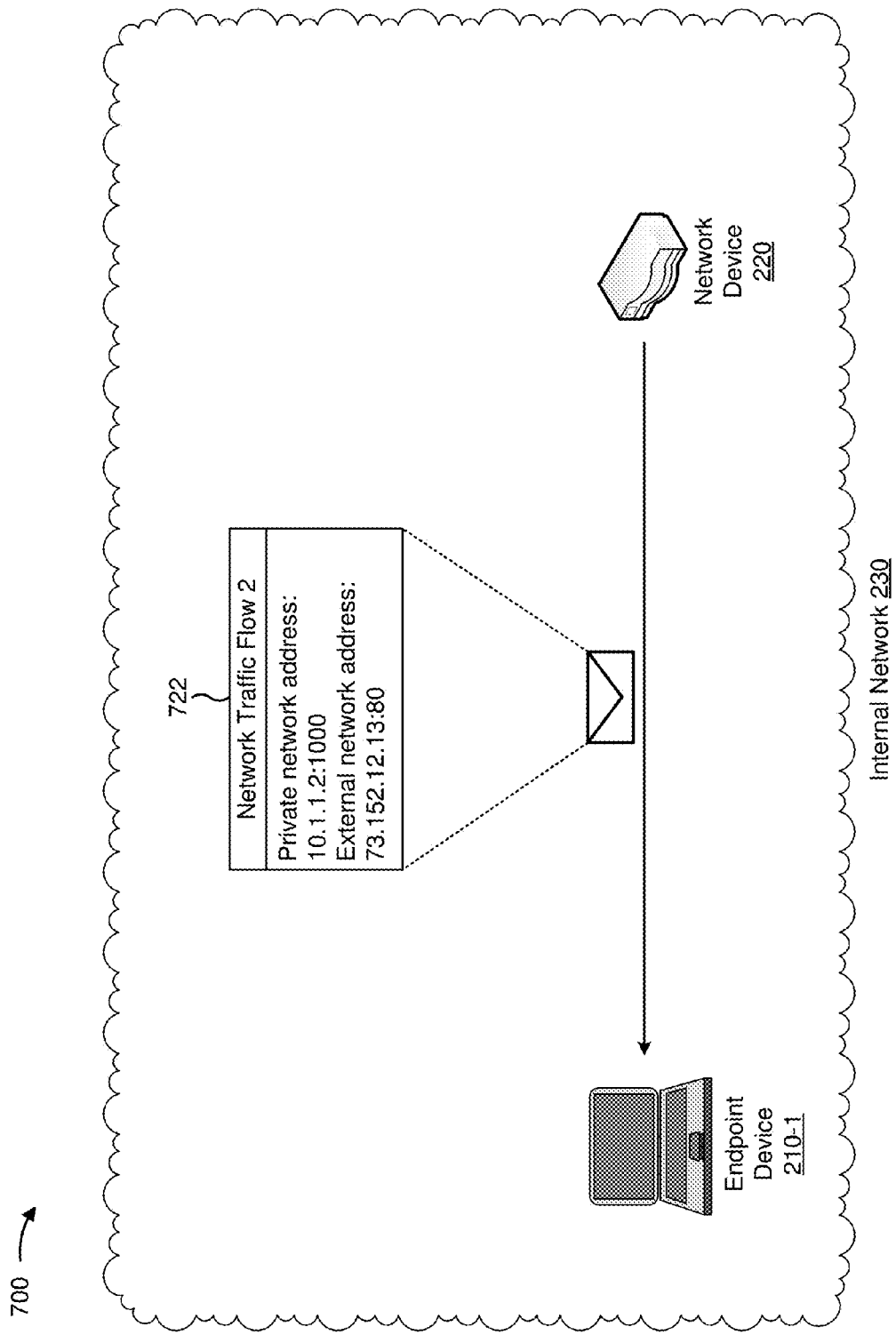

As shown in FIG. 7D, and by reference number 722, network device 220 may provide the second network traffic flow to endpoint device 210-1. Assume that network device 220 provides the second network traffic flow to endpoint device 210-1 based on endpoint device 210-1 being associated with the second private network address.

Figure 7E:
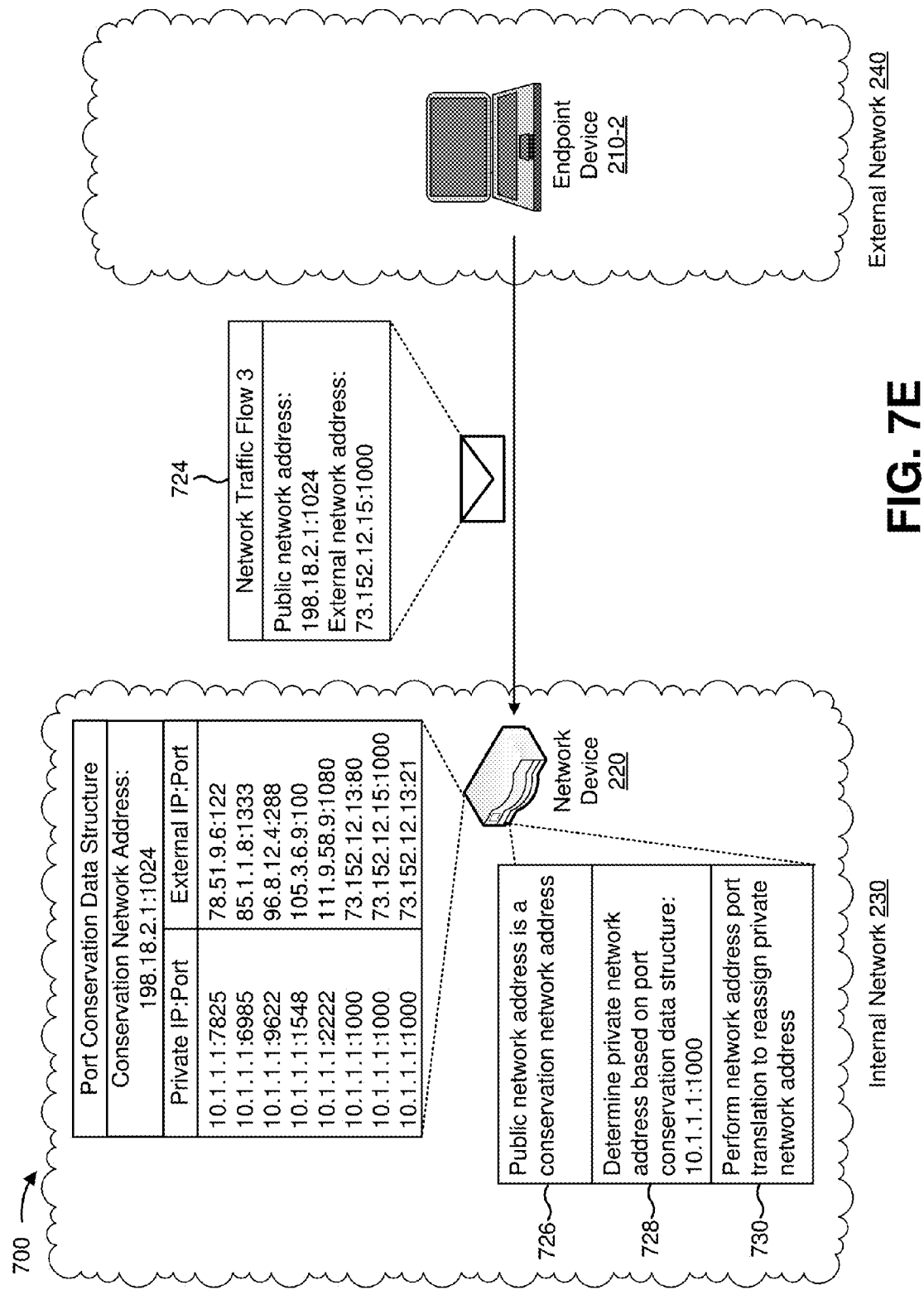

As shown in FIG. 7E, and by reference number 724, network device 220 may receive, from endpoint device 210-2, a third network traffic flow (e.g., "Network Traffic Flow 3"). As shown, the third network traffic flow may be associated with the first public network address of 198.18.2.1:1024 and the second external network address of 73.152.12.15:1000. As shown, network device 220 may store a port conservation data structure that associates the first private network address of 10.1.1.1:1000 and the second external network address of 73.152.12.15:1000.

As shown by reference number 726, network device 220 may determine that the first public network address matches the conservation network address. Assume that network device 220 compares the first public network address to the conservation network address, identified by the port conservation data structure, to determine that the first public network address matches the conservation network address.

As shown by reference number 728, network device 220 may refer to the port conservation data structure to determine a private network address that is associated with the second external network address of 73.152.12.15:1000. As shown, network device 220 determines that the first private network address of 10.1.1.1:1000 is associated with the second external network address. As shown by reference number 730, network device 220 performs network address port translation to reassign, to the third network traffic flow, the first private network address.

Figure 7F:
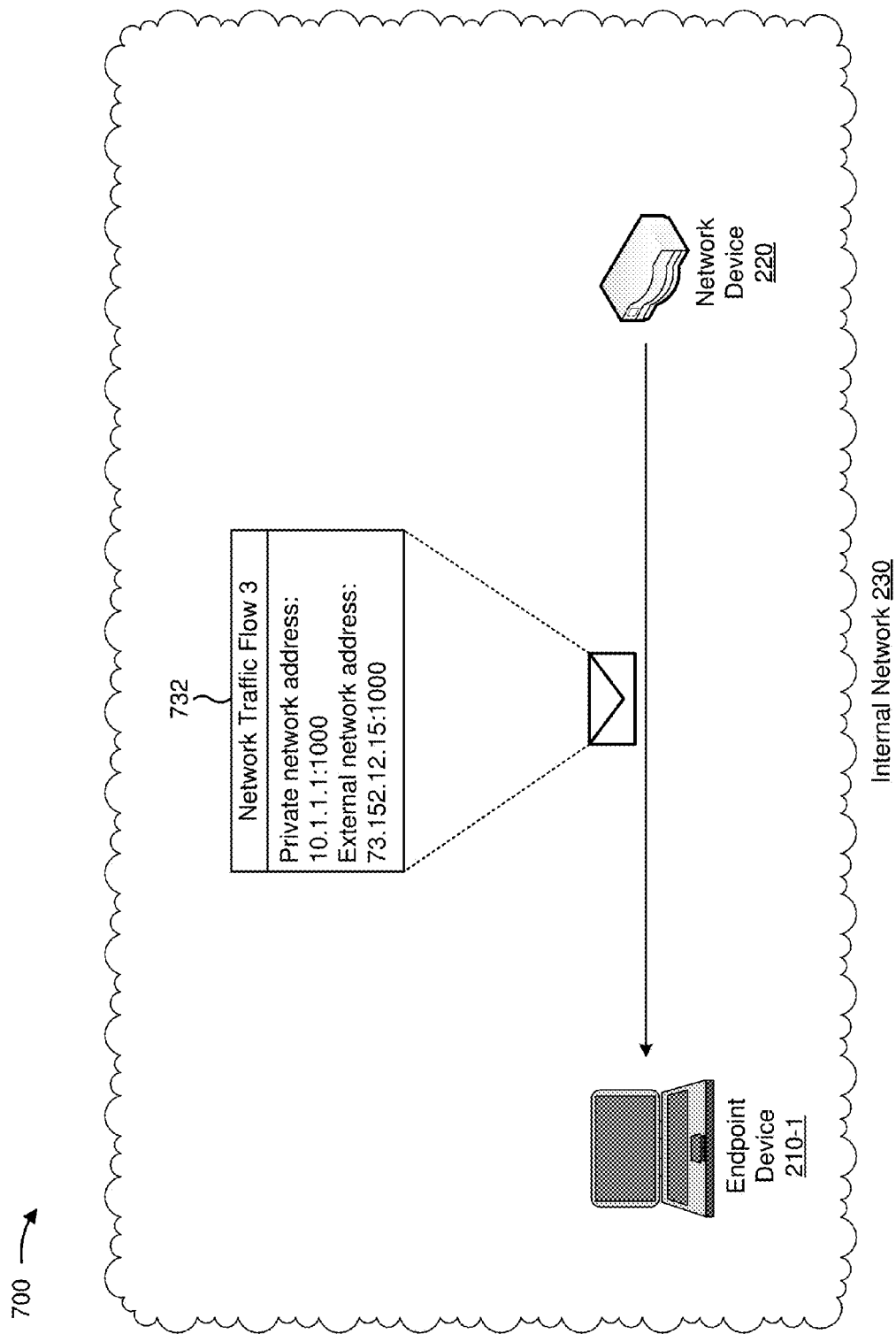

As shown in FIG. 7F, and by reference number 732, network device 220 may provide, to endpoint device 210-1, the third network traffic flow. Assume that network device 220 provides the third network traffic flow to endpoint device 210-1 based on endpoint device 210-1 being associated with the first private network address.

As indicated above, FIGS. 7A-7F are provided merely as an example. Other examples are possible and may differ from what was described with regard to FIGS. 7A-7F.

Figure 8A:
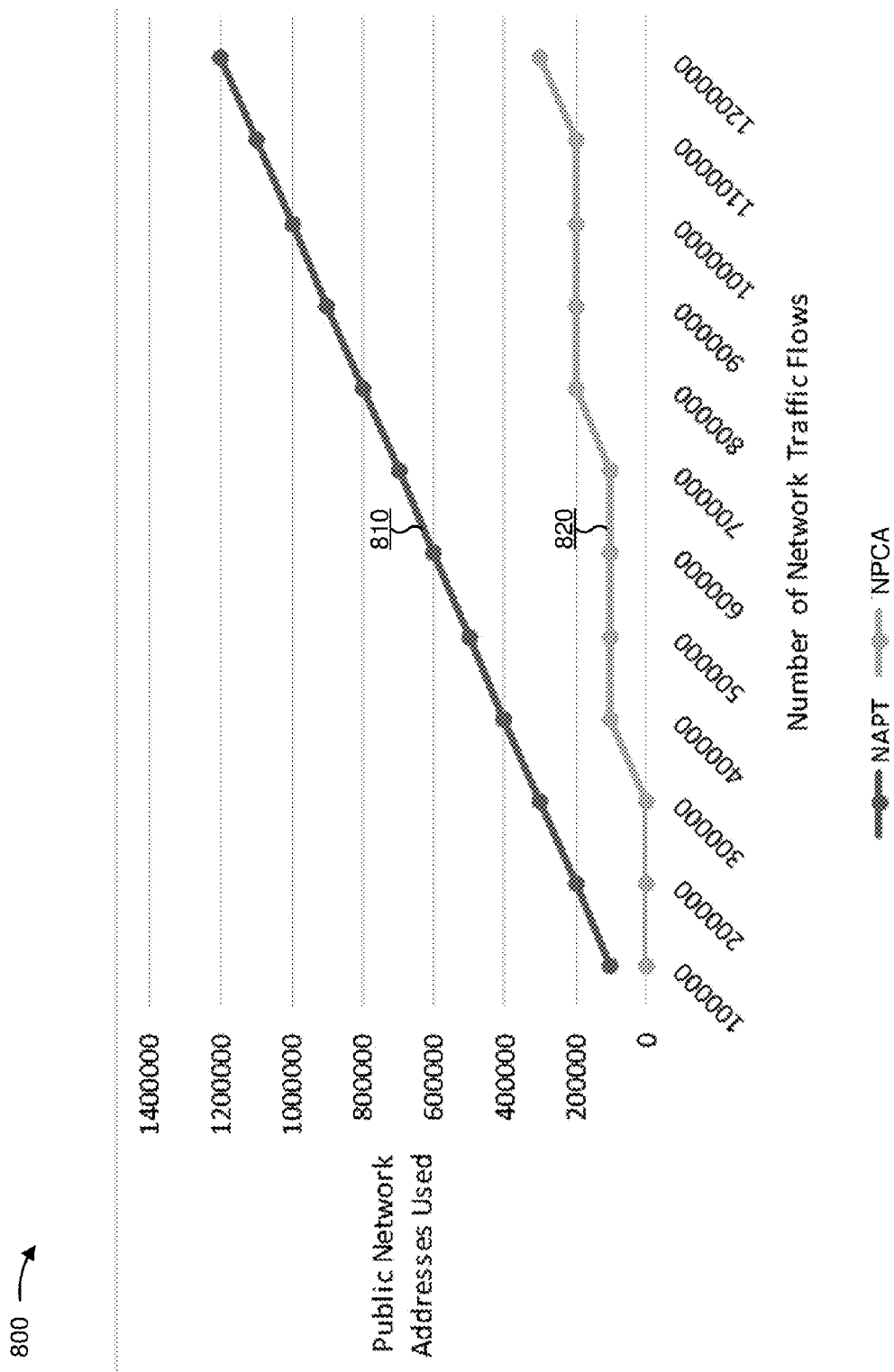
FIGS. 8A-8C are example charts of projected usage of public network addresses by network devices alternatively using, and not using, implementations described herein.
Figure 8B:
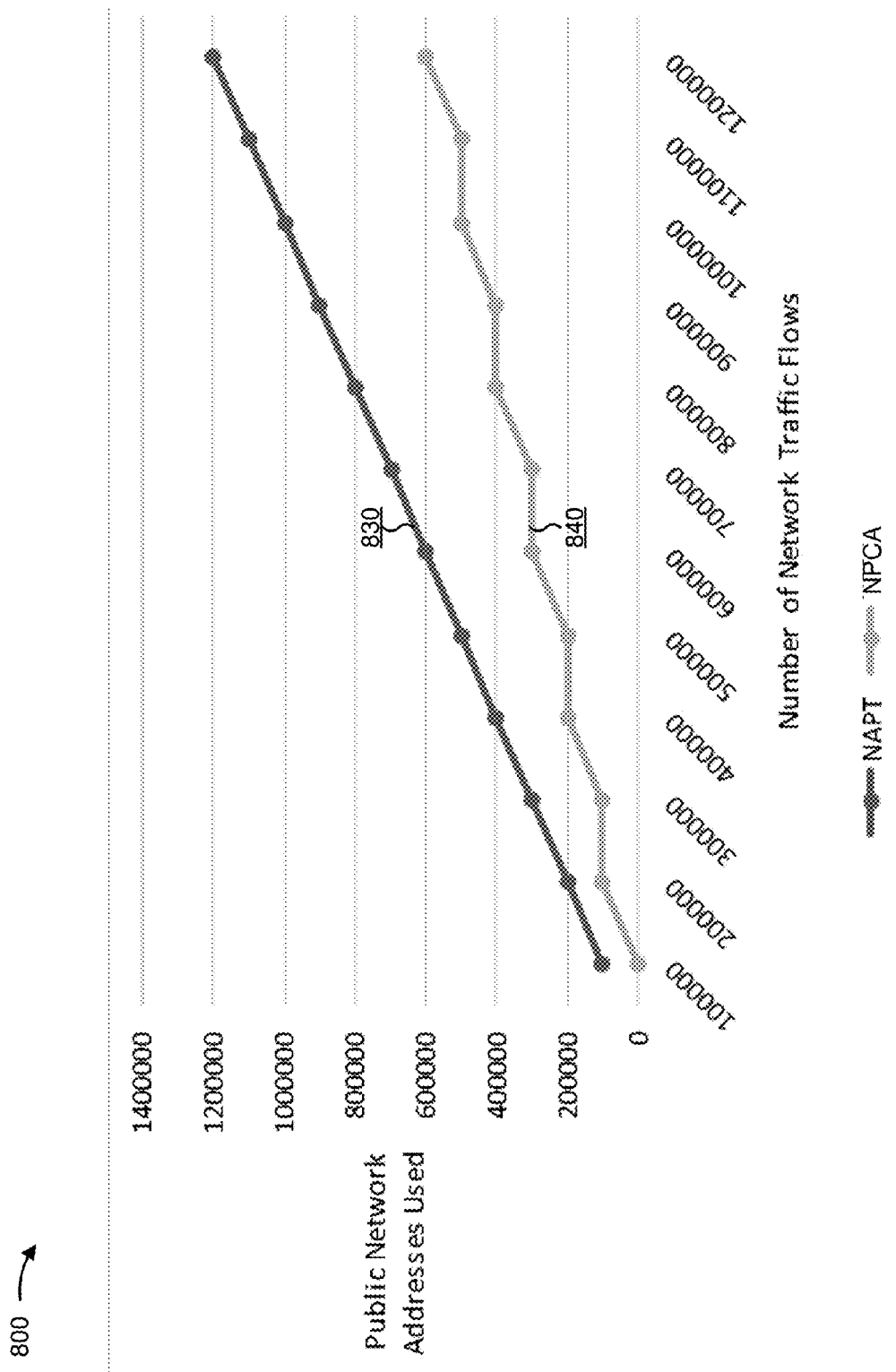
Figure 8C:
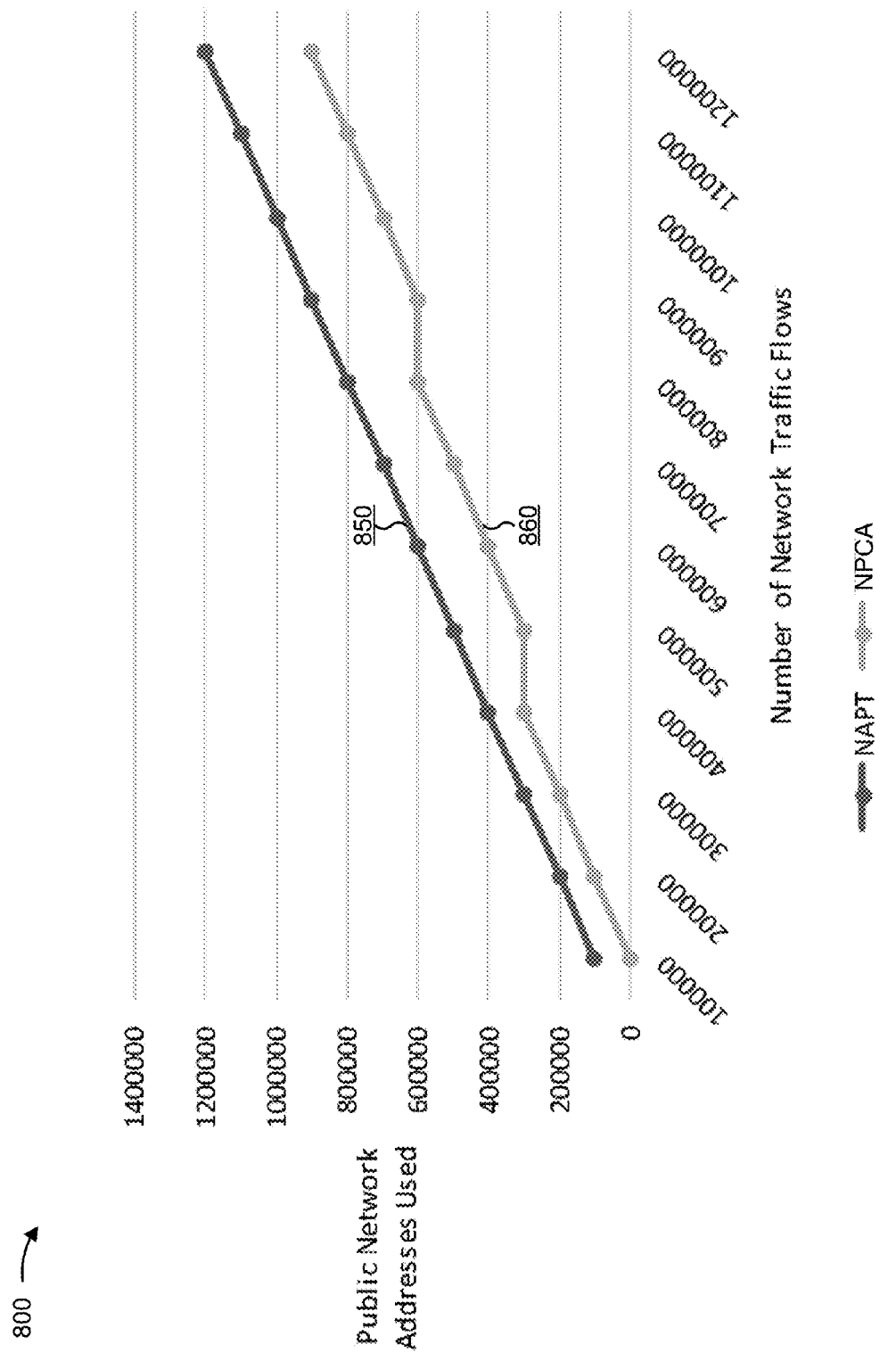

FIGS. 8A-8C are example charts of projected usage of public network addresses by network devices 220 alternatively using, and not using, implementations described herein.

FIG. 8A describes projected public network address usage by network device 220 in situations where 75% of network traffic flows are destined to a previously un-encountered external network address. Reference number 810, shown in FIG. 8A, describes projected public network address usage, by network device 220, in a situation where network device 220 is not using the network port preservation algorithm. As shown, network device 220 may use a different public network address for each network traffic flow. As shown, a 100,000th network traffic flow may be assigned a 100,000th public network address, a 200,000th network traffic flow may be assigned a 200,000th public network address, and so on.

Reference number 820, shown in FIG. 8A, describes projected public network address usage, by network device 220, in a situation where network device 220 is using the network port preservation algorithm (e.g., NPPA). As shown, network device 220 may use fewer public network addresses when using the network port preservation algorithm. Here, network device 220 may use 100,000 public network addresses for a first 400,000 network traffic flows, may use 200,000 public network addresses for a first 800,000 network traffic flows, may use 300,000 public network addresses for a first 1,200,000 network traffic flows, and so on. In this way, network device 220 may reduce consumption of public network addresses by using the network port preservation algorithm.

FIG. 8B describes projected public network address usage by network device 220 in situations where 50% of network traffic flows are destined to a previously un-encountered external network address. Reference number 830, shown in FIG. 8B, describes projected public network address usage, by network device 220, in a situation where network device 220 is not using the network port preservation algorithm. As shown, network device 220 may use a different public network address for each network traffic flow. As shown, a 100,000th network traffic flow may be assigned a 100,000th public network address, a 200,000th network traffic flow may be assigned a 200,000th public network address, and so on.

Reference number 840, shown in FIG. 8B, describes projected public network address usage, by network device 220, in a situation where network device 220 is using the network port preservation algorithm (e.g., NPPA). As shown, network device 220 may use fewer public network addresses when using the network port preservation algorithm. Here, network device 220 may use 100,000 public network addresses for a first 300,000 network traffic flows, may use 200,000 public network addresses for a first 500,000 network traffic flows, may use 300,000 public network addresses for a first 700,000 network traffic flows, and so on. In this way, network device 220 may reduce consumption of public network addresses by using the network port preservation algorithm.

FIG. 8C describes projected public network address usage by network device 220 in situations where 25% of network traffic flows are destined to a previously un-encountered external network address. Reference number 850, shown in FIG. 8C, describes projected public network address usage, by network device 220, in a situation where network device 220 is not using the network port preservation algorithm. As shown, network device 220 may use a different public network address for each network traffic flow. As shown, a 100,000th network traffic flow may be assigned a 100,000th public network address, a 200,000th network traffic flow may be assigned a 200,000th public network address, and so on.

Reference number 860, shown in FIG. 8C, describes projected public network address usage, by network device 220, in a situation where network device 220 is using the network port preservation algorithm (e.g., NPPA). As shown, network device 220 may use fewer public network addresses when using the network port preservation algorithm. Here, network device 220 may use 300,000 public network addresses for a first 500,000 network traffic flows, may use 600,000 public network addresses for a first 900,000 network traffic flows, may use 900,000 public network addresses for a first 1,200,000 network traffic flows, and so on. In this way, network device 220 may reduce consumption of public network addresses (e.g., IP address/network port combinations, etc.) by using the network port preservation algorithm.

As indicated above, FIGS. 8A-8C are provided merely as an example. Other examples are possible and may differ from what was described with regard to FIGS. 8A-8C. For example, network device 220, when performing network address port translation based on the network port preservation algorithm, may use a different quantity of public network addresses than a quantity shown in connection with FIGS. 8A-8C (e.g., more public network addresses, fewer public network addresses, etc.).

In this way, network device 220 may improve efficiency of network device 220 and/or reduce network congestion by conserving public network addresses (e.g., IP address/network port combinations, etc.) used for network address port translation.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, at least partially implemented in hardware, to:
receive a network traffic flow,
the network traffic flow being associated with a private network address and an external network address;
determine whether the external network address is identified in a data structure, the data structure identifying external network addresses and private network addresses of network traffic flows that are assigned a conservation public network address,
the conservation public network address including a particular Internet Protocol (IP) address and a particular network port, and
the conservation public network address being assigned to previously un-encountered IP address and network port combinations;
selectively assign, to the network traffic flow, the conservation public network address, or a second public network address selected from a pool of available public network addresses, based on determining whether the external network address is identified by the data structure,
the conservation public network address being assigned to the network traffic flow when the external network address is not identified by the data structure and previously un-encountered, and
the second public network address being assigned to the network traffic flow when the external network address is identified by the data structure and previously assigned to the conservation public network address;
selectively add, to the data structure, the private network address and the external network address,
the private network address and the external network address being added to the data structure when the conservation public network address is assigned to the network traffic flow, and
the private network address and the external network address not being added to the data structure otherwise; and
provide to the network traffic flow the conservation public network address or the second public network address, based on the external network address.

2. The device of claim 1, where the one or more processors are to: receive another network traffic flow, the other network traffic flow being associated with the conservation public network address and with a particular external network address; determine that the other network traffic flow is associated with the conservation public network address; determine a particular private network address based on the data structure and based on the particular external network address, the data structure storing information associating the particular private network address and the particular external network address with the conservation public network address; and provide the other network traffic flow based on the particular private network address.

3. The device of claim 1, where the one or more processors, when assigning the conservation public network address or the second public network address, are to: replace the private network address with the conservation public network address or the second public network address in a header of a packet.

4. The device of claim 1, where the one or more processors are to:
receive a particular network traffic flow, the particular network traffic flow being associated with the second public network address and with a particular external network address;
determine that the particular network traffic flow is not associated with the conservation public network address;
determine a corresponding private network address corresponding to at least one of the second public network address or the particular external network address; and
provide the particular network traffic flow based on the corresponding private network address.

5. The device of claim 1, where the second public network address includes an IP address and a network port.

6. The device of claim 1, where the one or more processors are further to: select the second public network address from the pool of available public network addresses associated with the device or associated with a network that includes the device.

7. The device of claim 1, where the pool of available public network addresses includes one IP address and a range of network ports.

8. A non-transitory computer-readable medium storing instructions, the instructions comprising:
one or more instructions that, when executed by one or more processors, cause the one or more processors to:
receive a network traffic flow that is associated with a private network address and that is destined for an external network address;
determine whether the external network address is identified in a data structure, the data structure identifying external network addresses and private network addresses of network traffic flows that are assigned a conservation public network address,
the conservation public network address including a particular Internet Protocol (IP) address and a particular network port, and
the conservation public network address being assigned to previously un-encountered IP address and network port combinations;
selectively assign, to the network traffic flow, the conservation public network address, or a second public network address, selected from a pool of available public network addresses, based on determining whether the external network address is identified by the data structure,
the conservation public network address being assigned to the network traffic flow when the external network address is not identified by the data structure and previously un-encountered, and the second public network address being assigned to the network traffic flows when the external network address is identified by the data structure and previously assigned to the conservation public network address, and
the second public network address being selected from the pool of available public network addresses;

selectively include, in the data structure, the private network address and the external network address,
the private network address and the external network address being added to the data structure when the conservation public network address is assigned to the network traffic flow, and
the private network address and the external network address not being added to the data structure otherwise; and
provide, based on the external network address, to the network traffic flow, the conservation public network address or the second public network address.

9. The non-transitory computer-readable medium of claim 8, where the one or more instructions, that cause the one or more processors to determine whether the external network address is identified by the data structure, cause the one or more processors to:
generate a search key corresponding to the external network address; and
search the data structure based on the search key to attempt to locate the external network address.

10. The non-transitory computer-readable medium of claim 9, where the one or more instructions, that cause the one or more processors to include the external network address in the data structure, cause the one or more processors to: include the search key, corresponding to the external network address, in the data structure.

11. The non-transitory computer-readable medium of claim 8, where the one or more instructions, when executed by the one or more processors, cause the one or more processors to:
receive another network traffic flow that is destined to the conservation public network address, the other network traffic flow being associated with another external network address that is identified by the data structure;
determine a corresponding private network address for the other network traffic flow based on the data structure and based on the other external network address; and
provide the other network traffic flow based on the corresponding private network address.

12. The non-transitory computer-readable medium of claim 8, where the one or more instructions, when executed by the one or more processors, cause the one or more processors to:
receive another network traffic flow that is destined to the second public network address;
determine that the other network traffic flow is not destined to the conservation public network address;
determine another private network address, associated with the other network traffic flow, based on the second public network address or based on another external network address associated with the other network traffic flow; and
provide, based on the other private network address, the other network traffic flow.

13. The non-transitory computer-readable medium of claim 8, where the one or more instructions, that cause the one or more processors to assign the conservation public network address or the second public network address, cause the one or more processors to:
replace the private network address with the conservation public network address or the second public network address in a header of a packet.

14. The non-transitory computer-readable medium of claim 8, where the pool of available public network addresses includes one IP address and a range of network ports.

15. A method, comprising:
receiving, by a device, a first network traffic flow,
the first network traffic flow being associated with a first private network address,
the first network traffic flow being destined to a first external network address;
determining, by the device, whether the first external network address is identified by a data structure,
the data structure identifying external network addresses and private network addresses of network traffic flows to which a single conservation public network address has been assigned,
the single conservation public network address including a particular Internet Protocol (IP) address and a particular network port, and
the single conservation public network address being assigned to previously un-encountered IP address and network port combinations;
selectively assigning, by the device, the single conservation public network address to the first network traffic flow, or a second public network address selected from a pool of available network addresses, based on determining whether the first external network address is identified by the data structure,
the single conservation public network address being assigned to the first network traffic flow when the first external network address is not identified by the data structure and previously un-encountered, and
the second public network address being assigned to the first network traffic flow when the first external network address is identified by the data structure and previously assigned to the single conservation public network address;
selectively add, to the data structure, the first private network address and the first external network address,
the first private network address and the first external network address being added to the data structure when the single conservation public network address is assigned to the first network traffic flow, and
the first private network address and the first external network address not being added to the data structure otherwise; and
providing, by the device, to the first network traffic flow, the single conservation public network address or the second public network address, based on the first external network address.

16. The method of claim 15, comprising:
receiving a second network traffic flow,
the second network traffic flow being associated with a second external network address,
the second external network address being identified by the data structure;
determining that the second external network address is identified by the data structure;
assigning, to the second network traffic flow, another public network address,
the other public network address being different than the single conservation public network address; and
outputting the second network traffic flow with the second external network address and the other public network address.

17. The method of claim 16, comprising:
receiving an inbound network traffic flow that is destined for the other public network address,
the inbound network traffic flow being associated with the second external network address;

determining an associated private network address, that is associated with the inbound network traffic flow, based on the other public network address and based on the second external network address; and outputting the inbound network traffic flow with the associated private network address.

18. The method of claim 16, where assigning the other public network address comprises:

selecting the other public network address from a plurality of available public network addresses.

19. The method of claim 15, further comprising:

receiving another network traffic flow, the other network traffic flow being destined for the single conservation public network address, and the other network traffic flow being associated with the first external network address;

determining the first private network address based on the data structure and based on the first external network address; and outputting the other network traffic flow with the first private network address.

20. The method of claim 15, where the data structure identifies one or more search keys that are generated based on external network addresses of one or more network traffic flows to which the single conservation public network address has been assigned; and where determining that the first external network address is identified by the data structure comprises:

generating a search key based on the first external network address; and determining that the search key generated based on the first external network address matches a search key of the one or more search keys identified by the data structure.

* * * * *